(12) United States Patent
Fantasia et al.

(10) Patent No.: US 6,742,000 B1
(45) Date of Patent: May 25, 2004

(54) SYSTEM AND METHOD FOR DEFINING A MAINTENANCE PROGRAM

(75) Inventors: Lynne Fantasia, Chandler, AZ (US); Richard Idehara, Mesa, AZ (US); Mario Lombardi, Scottsdale, AZ (US); Forest Hover, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/565,034

(22) Filed: May 3, 2000

(51) Int. Cl.⁷ .............................................. G06F 17/30
(52) U.S. Cl. .................... 707/104.1; 707/707; 707/6; 707/101; 707/102; 701/29; 714/1; 714/25; 714/26; 702/184
(58) Field of Search .............................. 707/100, 101, 707/102, 6, 104.1; 714/1, 25, 26; 703/13, 17; 702/182, 184; 701/29

(56) References Cited

U.S. PATENT DOCUMENTS

| | | | | |
|---|---|---|---|---|
| 5,161,158 A | * | 11/1992 | Chakravarty et al. | 714/26 |
| 5,216,612 A | * | 6/1993 | Cornett et al. | 700/96 |
| 5,586,252 A | * | 12/1996 | Barnard et al. | 714/48 |
| 5,856,931 A | * | 1/1999 | McCasland | 702/182 |
| 5,963,884 A | * | 10/1999 | Billington et al. | 702/56 |
| 6,006,171 A | * | 12/1999 | Vines et al. | 700/83 |
| 6,067,486 A | * | 5/2000 | Aragones et al. | 701/29 |
| 6,125,312 A | * | 9/2000 | Nguyen et al. | 701/35 |
| 6,192,325 B1 | * | 2/2001 | Piety et al. | 702/183 |
| 6,223,143 B1 | * | 4/2001 | Weinstock et al. | 703/17 |
| 6,408,258 B1 | * | 6/2002 | Richer | 702/182 |
| 6,442,459 B1 | * | 8/2002 | Sinex | 701/29 |
| 6,549,880 B1 | * | 4/2003 | Willoughby et al. | 703/13 |
| 2002/0161614 A1 | * | 10/2002 | Spira et al. | 705/7 |

OTHER PUBLICATIONS

Christopher Marsh, "The ISA expert System: a Prototype System for Failure Diagnosis on the Space Station", Proceeding of th 1st International conference on Industrial and Engineering applications, 1988, vol. 1, pp. 60–74.*

Advisory Circular No. 120–17A "Maintenance Control by Reliability Methods", Mar. 27, 1988, 28 pages.*

Morris et al., "Reliability Toolkit: Commercial Practices Edition", Rome Laboratory, Oct. 13, 1995, 495 pages.*

Sep. 12, 1993, Airline/Manufacturer Maintenance Program Development Document MSG–3 (Revision 2).

* cited by examiner

Primary Examiner—Jean R. Homere
Assistant Examiner—Khanh Pham
(74) Attorney, Agent, or Firm—Robert Desmond, Esq.

(57) ABSTRACT

A system and method for performing RCM analysis is disclosed. The system is an automated system for performing RCM analysis/maintenance program development requirements. The invention adheres to MSG-3 standards and guidelines. The system provides a user interface which is broken down in a hierarchical fashion which easily allows a user to enter data in accordance with MSG-3 procedures. A database includes one or more systems. Systems can be further refined to include one or more subsystems, sub-subsystems and parts. RCM analysis is performed at a Maintenance Significant Item (MSI) level which includes defining reliability data for the MSI. A part, by definition is an MSI. However, a subsystem or a system can also be an MSI. A system includes functions. A function can have one or more failures associated with it. There can be one or more effects associated with a failure. There can be one or more causes for an effect. A functional failure/failure effect is classified as: (1) evident safety; (2) evident operational; (3) evident economic; (4) hidden safety; or (5) hidden non-safety. Depending on the category of failure, a list of task types which may be applicable and effective is provided. Maintenance intervals are specified for those tasks which are applicable and effective. The information is provided to the user using various forms.

18 Claims, 25 Drawing Sheets

MSG-3 Creator Training–Maintenance Program Development–MSG-3 Systems & Powerplant Analysis

| | ATA | Description | | | |
|---|---|---|---|---|---|
| System | 72 | AS936 TORBOFAN ENGINE | Add | Edit | Delete |
| | 74 | IGNITION | | | |
| | 80 | STARTING | | | |
| Sub System | 30 | Compressor Section | D&O | Add | Add Sub | Edit | Del |
| | 40 | Combustion Section | | | |
| | 50 | Turbine Section | | | |
| Parts | | | D&O | Add | | Relib. |
| | | Description | | | |
| Function | | | Add | Edit | Del |
| Failure | | | | Add | Edit |
| | | | | Ins | Del |
| Effect | | | | Add | Edit |
| | | | | Ins | Del |
| | | | | Categorize | |
| Cause | | | | Add | Edit |
| | | | | Ins | Del |
| | | | | Task | |

MSG-3 Creator Training—Maintenance Program Development—MSG-3 Systems & Powerplant Analysis

MAINTENANCE SIGNIFICANT ITEM SELECTION (MSI)

| FORM: 0 | ATA NO.<br>72-51-00 | Item Description<br>High Pressure Turbine | | | | | | | MSI |
|---|---|---|---|---|---|---|---|---|---|
| ATA Number | Part Number Manufacturer/ Supplier | Description | Could failure affect safety on ground or in flight? | Could failure be undetectable during normal operation? | Could failure have significant operational economic impact? | Could failure have significant non-operational economic impact? | MSI ? | Highest Manageable MSI Level | Remarks |
| 72-51-00 | None | High Pressure Turbine | Yes | Yes | Yes | Yes | Yes | 725100 | None |
| 72-51-01 | 3035025-04 | 1st Stg. HP Turbine Nozzle | Yes | Yes | Yes | No | Yes | 725100 | |
| 72-51-04 | 3035032-06 | 1st Stg. HP Turbine Rotor | Yes | Yes | No | Yes | Yes | 725100 | |
| 72-51-09 | 3035632-02 | 2nd Stg HP Turbine Nozzle | Yes | Yes | Yes | No | Yes | 725100 | |
| 72-51-15 | 3035678-09 | 2nd Stg HP Turbine Rotor | Yes | Yes | Yes | Yes | Yes | 725100 | |
| 72-51-20 | 3035698-31 | HP Turbine Nozzle Support | Yes | Yes | Yes | Yes | Yes | 725100 | |

| Analyst: Forest Hover<br>Honeywell Engines & Systems | Working Group:<br>Propulsion & Auxiliary Power | ISC Approval: | Revision:<br>Draft | Date:<br>3/18/00 | Page:<br>1 of 17 |
|---|---|---|---|---|---|

Sample Data

FIG. 21

MSG-3 Creator Training-Maintenance Program Development-MSG-3 Systems & Powerplant Analysis

COMPONENT-MAINTAINABILITY AND RELIABILITY DATA

| FORM: 2 | MSI NO. | Item Description | | | | | | MRD |
|---|---|---|---|---|---|---|---|---|
| | 725100 | High Pressure Turbine | | | | | | |

| MSI Number | Description | Qty | Supplier | Part Number Manufacturer/ Supplier | Similar To | Historical MTBUR | Predicted MTBUR | MMEL |
|---|---|---|---|---|---|---|---|---|
| 725100 | High Pressure Turbine | 0 | | None | | | | |
| 725101 | 1st Stg HP Turbine Nozzle | 4 | Honeywell Engines & Systems | 3035025-04 | TFE731 | 32500 | 35000 | |
| 725104 | 1st Stg HP Turbine Rotor | 4 | Honeywell E&S | 3035032-06 | TFE731-60 | 70000 | 75000 | |
| 725109 | 2nd Stg HP Turbine Nozzle | 2 | Honeywell E&S | 3035632-02 | TFE 1042 | 350000 | 350000 | |
| 725115 | 2nd Stg HP Turbine Rotor | 2 | Honeywell E&S | 3035678-09 | New | | 450000 | |
| 725120 | HP Turbine Nozzle Support | 2 | Honeywell E&S | 3035698-31 | TFE731-60 | 500000 | 500000 | |

References:

Sample Data

| Analyst: Forest Hover | Working Group: | ISC Approval: | Revision: | Date: | Page: |
|---|---|---|---|---|---|
| Honeywell Engines & Systems | Propulsion & Auxiliary Power | | Draft | 3/18/00 | 3 of 17 |

| FORM: 3 | MSI NO. 725100 | MSG-3 Creator Training-Maintenance Program Development-MSG-3 Systems & Powerplant Analysis | | FFA |
|---|---|---|---|---|
| | | Item Description: High Pressure Turbine | | |
| | | FUNCTIONAL FAILURE ANALYSIS | | |
| FUNCTION | FUNCTIONAL FAILURE | | FAILURE EFFECT | FAILURE CAUSE |
| 1 Functional 1 | A Functional Failure 1 A | 1 | Failure Effect 1 A 1 | |
| | B Functional Failure 1 B | 1 | Failure Effect 1 B 1 | a Failure Cause 1 B 1 a |
| | | | | b Failure Cause 1 B 1 b |
| | | 2 | Failure Effect 1 B 2 | a Failure Cause 1 B 2 a |
| | C Functional Failure 1 C | | | |
| | D Functional Failure 1 D | | | |
| 2 Functional 2 | | | | |
| 3 Functional 3 | A Failure 3 A | 1 | Effect 3 A 1 | a Cause 3 A 1 a |
| 4 Functional 4 | A Functional Failure 4 A | 1 | Failure Effect 4 A 1 | a Failure Cause 4 A 1 a |
| | B Functional Failure 4 B | | | |
| 5 Functional 5 | A Functional Failure 5 A | 1 | Failure Effect 5 A 1 | a Failure Cause 5 A 1 a |

| Analyst: Forest Hover | Working Group: | ISC Approval: | Revision: Draft | Date: 3/18/00 | Page: 4 of 17 |
|---|---|---|---|---|---|
| Honeywell Engines & Systems | Propulsion & Auxiliary Power | | | | |
| | Sample Data | | | | |

| FORM: 4 | MSG-3 Creator Training–Maintenance Program Development–MSG-3 Systems & Powerplant Analysis | | FEC |
|---|---|---|---|
| | FAILURE EFFECT CATEGORY | | |
| MSI NO. 725100 | MSI: High Pressure Turbine<br>Function: 1 Function 1<br>Failure: B Functional Failure 1 B<br>Effect: 1 Failure Effect 1 B 1 | | |

FAILURE EFFECT QUESTIONS

Question 1: Is the occurrence of a Functional Failure evident to the operating crew during the performance of their normal duties?
- Yes
- No

Question 2: Does the Functional Failure or secondary damage resulting from the Functional Failure have a direct adverse effect on operating safety?
- Yes → -5- Evident safety
- No

Question 3: Does the combination of the Hidden Functional Failure and one additional failure of a system related or backup function have an adverse effect on operating safety?
- Yes → -8- Hidden safety
- No → -9- Hidden Economic

Question 4: Does the Functional Failure have a direct adverse effect on operating capability?
- Yes → -6- Evident operational
- No → -7- Evident Economic

| QUESTION | ANSWER |
|---|---|
| 1 | Yes | Functional Failure will be evident to operating crew through instrument/warning panel indications. |
| 2 | No | No direct adverse effect on operating safety, multi-engine application, aircraft is safe for flight with loss of power of one engine. |
| 3 | N/A | Question 3 – Not Applicable |
| 4 | Yes | Aircraft may have altitude or range restrictions, or may be required to divert to an alternate destination. Corrective action is required prior to dispatch. |

| Category | EVIDENT OPERATIONAL | MMEL | No Go |
|---|---|---|---|
| Remarks | Probability of Functional Failure of Overspeed System in conjunction with an Overspeed Event is Extremely Improbable. | | |
| ISC Approval: | | Revision: Draft | Date: 3/18/00 | Page: 6 of 17 |

| Analyst: Forest Hover | Working Group: | |
|---|---|---|
| Honeywell Engines & Systems | Propulsion & Auxiliary Power | Sample Data |

FIG. 24

| FORM: 5-9 | MSG-3 Creator Training-Maintenance Program Development—MSG-3 Systems & Powerplant Analysis | | | | | TSQ |
|---|---|---|---|---|---|---|
| | MSI NO. 725100 | Item Description High Pressure Turbine | | | | |

| FAILURE EFFECT CATEGORY | Function: 3 Function 3<br>Failure: A Failure 3 A<br>Effect: 1 Effect 3 A 1<br>Cause: a Cause 3 A 1 a | | | | |
|---|---|---|---|---|---|
| | TASK SELECTION QUESTIONS | | | | |
| 5 6 7 8 9 | TASK SELECTION QUESTIONS | Yes | No | N/A | Answer & Explanation (Based on Applicability & Effectiveness Criteria) |
| A A A A A | A Is the lubrication or servicing task applicable and effective? | | X | | Task is not applicable because there is no consumable to replenish. |
| B | B Is a check to verify operation applicable and effective? | | | X | Question not applicable for Category 6 |
| B B B | C Is an inspection or functional check to detect degradation of the function (potential failure) applicable and effective? | X | | | A functional check to detect system degradation is applicable and effective. |
| C C C | D Is a restoration task to reduce the failure rate applicable and effective? | | X | | Task is not applicable because item does not show degradation at an identifiable age. |
| D D D | E Is a discard task to avoid failures or to reduce the failure rate applicable and effective? | | X | | Task is not applicable because item does not show degradation at an identifiable age. |
| E | F Is there a task or combination of tasks that are applicable and effective? | | | X | Question not applicable for Category 6 |

| TASK NO. | TASK DESCRIPTION | FEC | INTERVAL | REMARKS/EFFECTIVITY | ZONAL |
|---|---|---|---|---|---|
| 001 | Inspect It! | 6 | 75 Hrs | | |

| Analyst: Forest H. Hover | Working Group: | ISC Approval: | Revision: Draft | Date: 3/8/00 | Page: 12 of 17 |
|---|---|---|---|---|---|
| Honeywell Engines & Systems | Propulsion & Auxiliary Power | Sample Data | | | |

FORM: 10

MSG-3 Creator Training-Maintenance Program Development-MSG-3 Systems & Powerplant Analysis

MAINTENANCE TASK SUMMARY

| SYSTEM NO. | Item Description |
|---|---|
| 72-51-00 | High Pressure Turbine |

| TASK NUMBER | TASK DESCRIPTION | F-FF-FE-FC | FEC | INTERVAL | ZONE | ACCESS | REMARKS/ EFFECTIVITY |
|---|---|---|---|---|---|---|---|
| 725100-001 | Inspect It! | 3A1a | 6 | 75 Hrs | | | |
| 725100-201 | Detailed Inspection of HP Turbine blades and vanes. | 1B2a | 5 | 4000 Hrs | | | |

| Analyst: Forest H. Hover | Working Group: Propulsion & Auxiliary Power | ISC Approval: | Revision: Draft | Date: 3/29/00 | Page: 17 of 17 |
|---|---|---|---|---|---|
| Honeywell Engines & Systems | | | | | |

Sample Data

MTS

FIG. 25

SYSTEM AND METHOD FOR DEFINING A MAINTENANCE PROGRAM

FIELD OF THE INVENTION

This invention relates generally to failure analysis and, more particularly, a method and system for automating failure analysis/maintenance program development procedures.

BACKGROUND OF THE INVENTION

Reliability Centered Maintenance (RCM) Analysis is a design review technique that focuses on the development of products and processes. The technique determines actions which will reduce the risk of product field, failures and documents those actions and the review process. RCM is intended to result in preventative actions. RCM is a systematic group of activities intended to: (1) recognize and evaluate potential failures of a product or process and its effects; (2) identify actions which could eliminate or reduce the chance of the potential failure occurring; and (3) document the process.

The Air Transportation Association's (ATA's) Maintenance Steering Group 3rd Task Force (MSG-3) is an implementation of RCM. MSG-3 is the only process which is approved by the Federal Aviation Association (FAA) for the development of a Maintenance Review Board Report (MRBR) for transport aircraft. MSG-3 procedures are documented in *The Airline/Manufacturer Maintenance Program Development Document MSG-3* (hereinafter "MSG-3"), prepared by the Maintenance Steering Group-3 Task Force of the Air Transport Association of America, second revision, Sep. 12,1993, which is herein incorporated by reference. MSG-3 provides broad guidance and defines the logic-based analysis process which is used for the initial development of the most economic scheduled maintenance program which will maintain the inherent reliability and safety of an aircraft and its systems.

MSG-3 was originally developed for (and required by) the Major Airlines, and was later adopted by Regional Airlines, and most recently has become demanded by Business Aviation Users. MSG-3 is an expensive, time-consuming process which ties up valuable resources for an extended period of time. For example, the MSG-3 process for a propulsion system takes approximately 2000–2500 man hours. Even though this is a significant amount of time, it has been proven to provide tremendous payback to operators in minimizing preventative maintenance costs. Thus, a need exists for a system which completely and accurately adheres to the MSG-3 guidelines, yet reduces the resources (e.g., man hours) required for completing the process.

SUMMARY OF THE INVENTION

In accordance with the present invention, an apparatus and method allow a user to perform automated failure analysis for a system. In a preferred embodiment of the invention, the analysis is compliant with MSG-3 procedures.

In accordance with another aspect of the invention, the system is defined hierarchically. The highest level of the hierarchy is the system level. The next level is the subsystem level, followed by the sub-subsystem level and the parts level. A lower level (e.g., a part) can be included by any higher level (e.g., a sub-subsystem, a subsystem or a system). The system is defined in terms of functions. A function can include one or more failures. A failure can include one or more effects. An effect may have one or more causes.

In accordance with still another aspect of the invention failure analysis is performed at the Maintenance Significant Item (MSI) level. By definition, a part is an MSI. A subsystem or a system can also be defined to be an MSI. Failure analysis provides the user with questions whose answers are used to categorize the failure as: an evident safety failure; an evident operational failure; an evident economic failure; a hidden safety failure; or a hidden non-safety failure. Based on the failure category, the user is provided with a list of task types which may be performed.

BRIEF DESCRIPTION OF THE DRAWINGS

The subject invention will hereinafter be described in conjunction with the appended drawing figures, wherein like numerals denote like elements, and:

FIG. 14 is an exemplary main entry screen for a non-empty database;

FIG. 17 is an exemplary user interface for entering effect category information;

FIG. 18 is an exemplary user interface for entering task information; and

FIGS. 19–25 are exemplary forms output in response to a print request for a selected subsystem.

DESCRIPTION OF THE SPECIFIC EMBODIMENT

Figure 1:
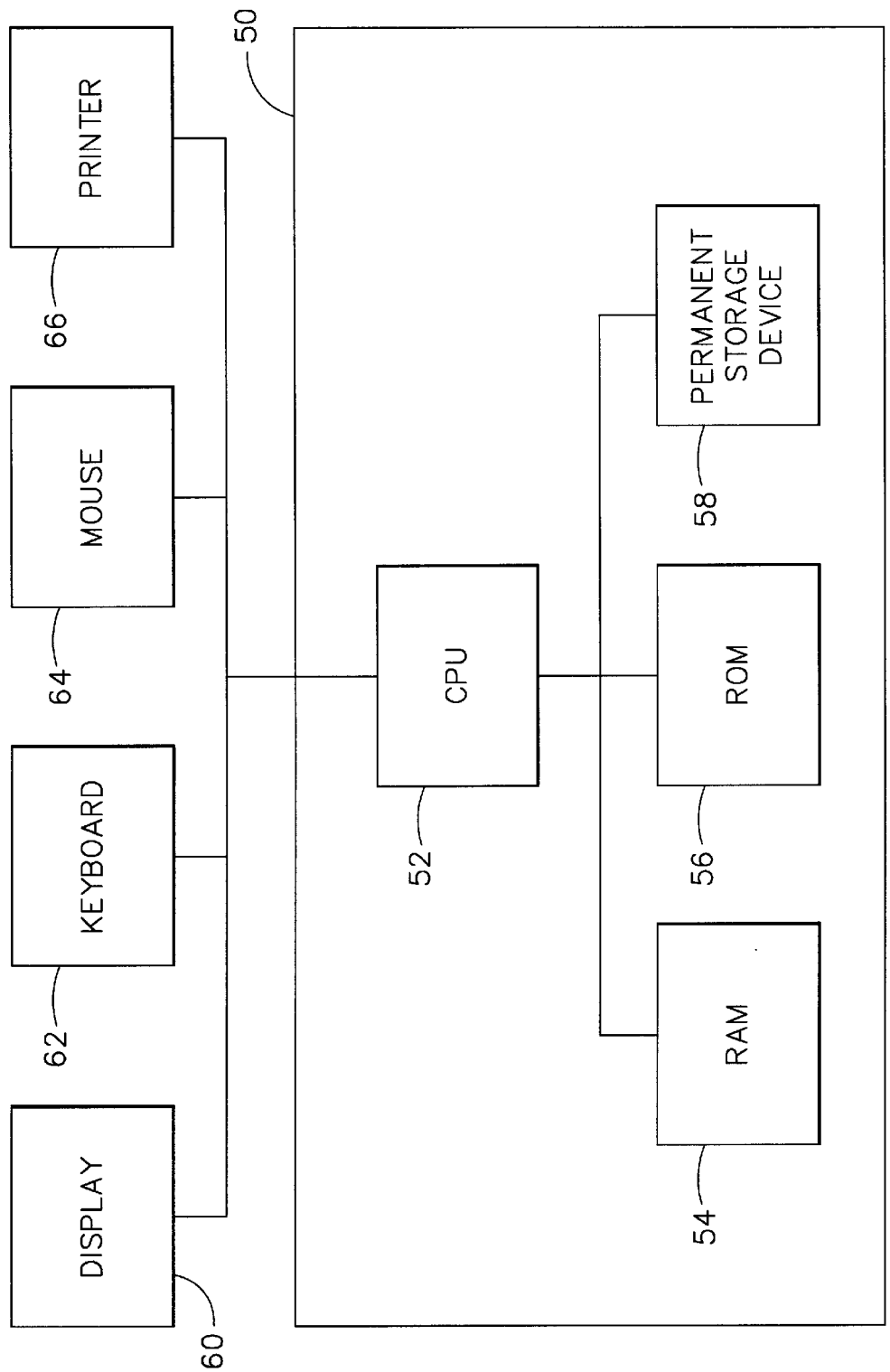
FIG. 1 is a block diagram of a computing environment suitable for implementing the present invention.

The present invention provides an automated method for determining a maintenance program for an aircraft system/powerplant in accordance with MSG-3. Manual MSG-3 analysis for a propulsion system typically takes 2000–2500 man hours. The present invention provides a system and method for automating the MSG-3 process which results in a savings of approximately 35% (e.g., a savings of 700–875 man hours for a propulsion system). MSG-3 analysis is generally performed by a working group which includes representatives from the engineering department, airframers, operators, etc. MSG-3 is an iterative process which often takes up to three months to get a consensus among the members of the working group, after a single meeting. Typically, 3–5 working group meetings are held over an 18–24 month time frame. This is largely due to the fact that the members review paper documents and discuss possible changes. The members then update the paper documents and meet again. This process is repeated until a consensus is reached. Automating the MSG-3 process, allows for real-time updating during working group meetings which significantly reduces the time required for this iterative process. While the present invention is ideally suited for MSG-3, it will be appreciated that the method and system of the present invention can be applied to other systems, for example, nuclear powerplants, oil drilling etc.

MSG-3 principally evaluates a system based on functional failures and causes. The system is identified in terms of Maintenance Significant Items (MSIs). Conservative engineering judgement is used to define the MSIs based on the anticipated consequences of a failure. MSIs are items which are identified by the manufacturer whose failure could include one or more of the following factors: (1) affect safety (on the ground or in flight); (2) be undetectable or not likely to be detected during operations; (3) have significant operational impact; and (4) have significant economic impact. An aircraft is partitioned into two major functional areas: (1) ATA Systems; and (2) Subsystems. The partitioning is continued until components which are not replaced on-aircraft are identified. A candidate MSI is usually a system or subsystem and is generally one level above those components which are not replaced on-aircraft. An MSI is considered to be the highest manageable level because it is high enough to avoid unnecessary analysis, but low enough to be properly analyzed to ensure that all functions, failures and causes are covered.

After the MSIs have been selected, for example, using the criteria described above, the following must be identified for each MSI: (1) function(s); (2) functional failure(s); (3) failure effect(s); and (4) failure cause(s). Functions define the normal characteristic actions of an item. Functional failures define how an item fails to perform its function. Failure effects are the result of a functional failure. Failure causes are the reasons that a functional failure occurs.

Tasks and intervals required in a maintenance program are identified. Both economic and safety related tasks are included in order to produce an initial scheduled maintenance program.

FIG. 1 illustrates a computing environment suitable for implementing the present invention. Computer 50 includes a central processing unit (CPU) 52. Computer 50 also includes memory in the form of random access memory (RAM) 54 and read-only memory (ROM) 56. Computer 50 also includes a permanent storage device 58, such as a hard disk drive.

Computer 50 includes a display device 60, al keyboard 62, a pointing device, such as a mouse 64 and a printing device 66.

It will be appreciated that many computing environments are suitable for implementing the present invention. For example, Computer 50 may be a Personal Computer (PC) running any one of a variety of operating systems, for example, Microsoft NT, Windows 95 or Windows 98. Computer 50 can be a stand-alone computer or it can be connected to a network. It will also be appreciated that computer 50 contains many more components than those illustrated in FIG. 1, however it is not necessary to show all of theses components in order to disclose an illustrative computing environment suitable for implementing the present invention.

Figure 2:
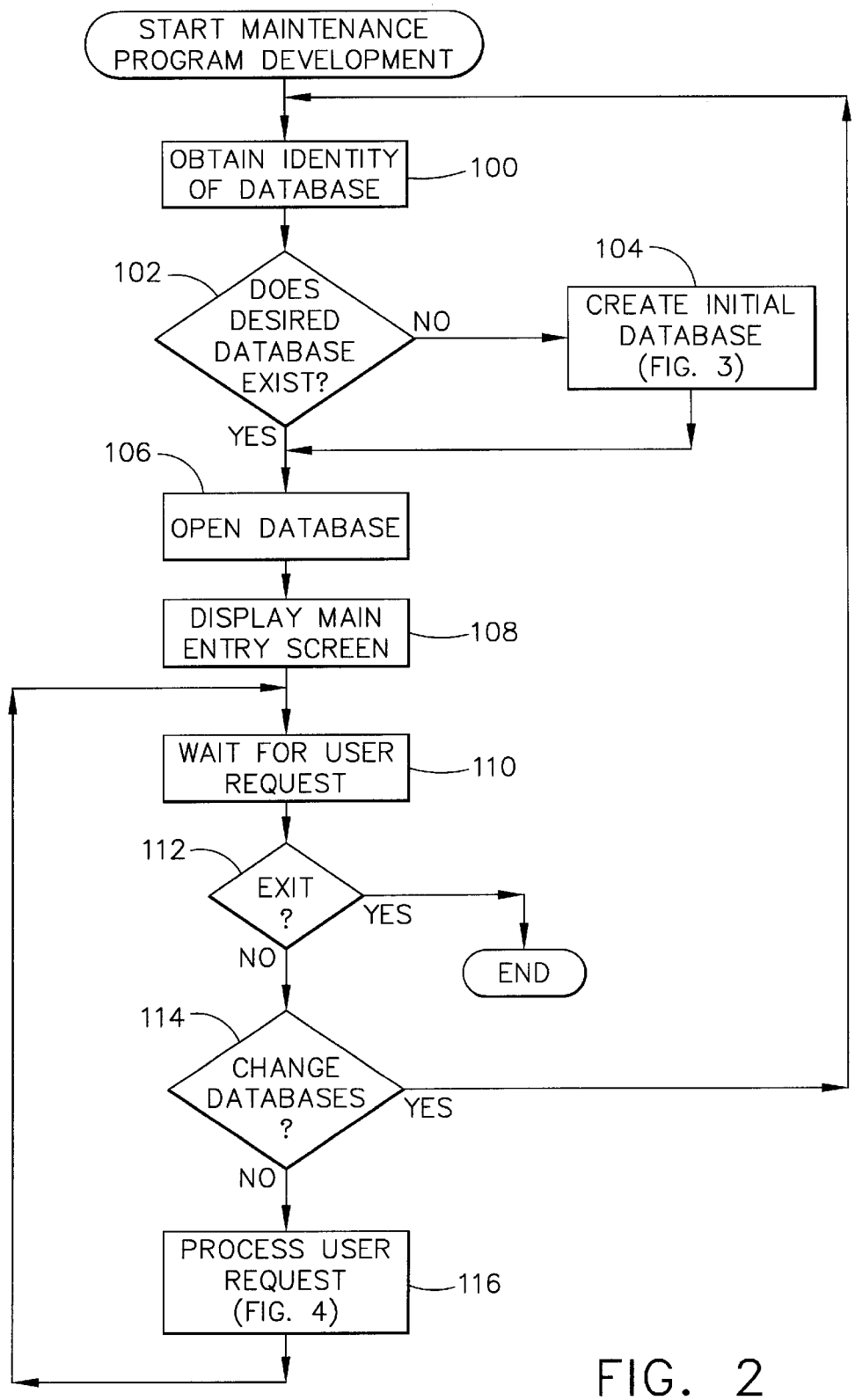
FIG. 2 is a flow diagram illustrating an exemplary logic flow implemented for a maintenance program in accordance with the present invention.

FIGS. 2–11 are flow diagrams depicting exemplary logic used to perform automated failure analysis in an environment such as the one illustrated in FIG. 1. FIG. 2 is a flow diagram illustrating an exemplary logic flow for implementing the overall logic of the present invention. The logic moves from a start block to block 100 where a database identity is obtained. The database identity identifies the database which includes a system of interest. In one embodiment of the invention, an Access database is utilized for storing data relating to a plurality of systems. It will be appreciated that the invention is not limited to a specific database or even a specific type of database. Once a database has been identified, the logic moves to decision block 102 where a test is made to determine if the desired database exists. If not, the logic moves to block 104 to create an initial database as illustrated in detail in FIG. 3 and described next.

Figure 3:
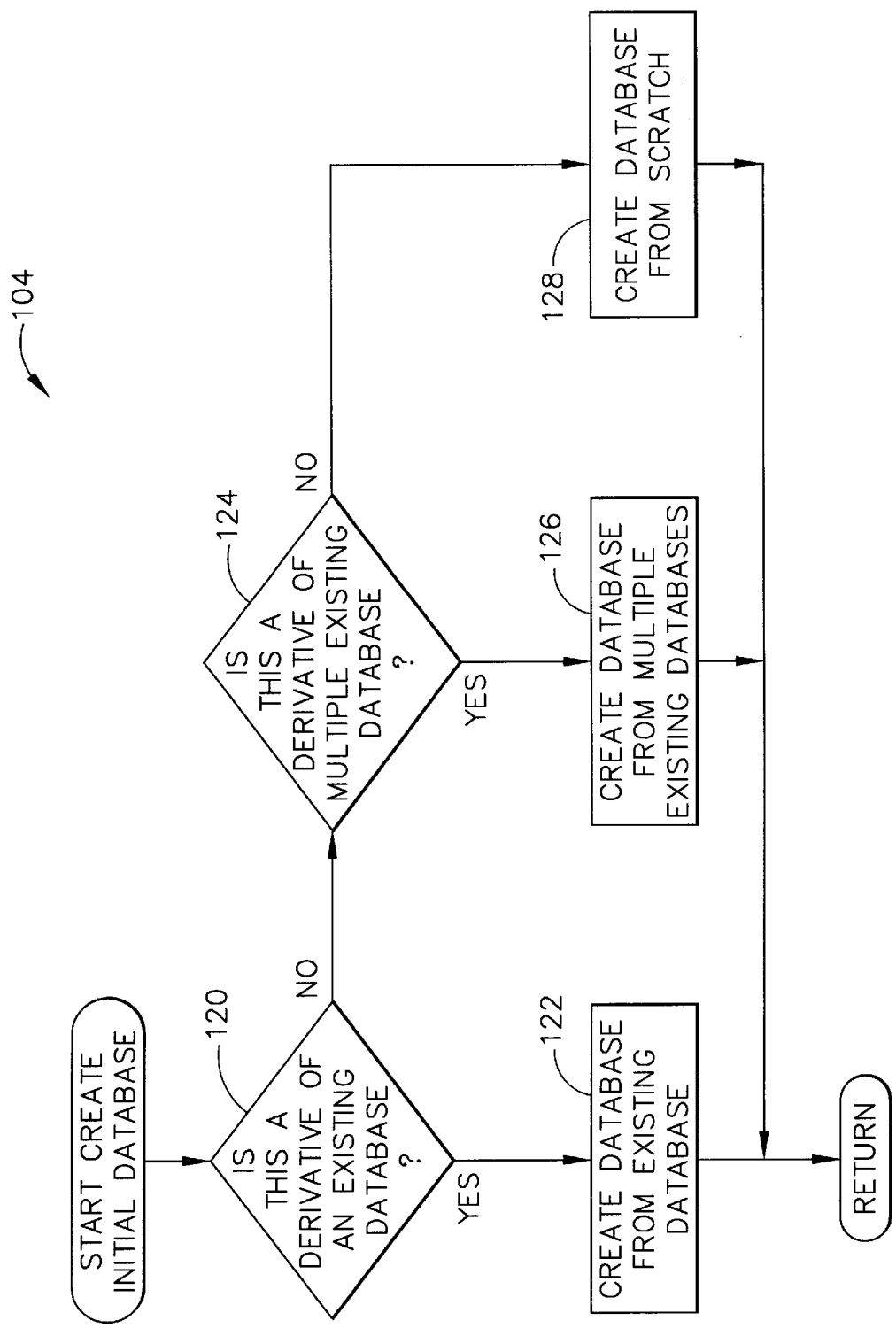
FIG. 3 is a flow diagram illustrating exemplary logic for creating an initial system database for the maintenance program illustrated in FIG. 2.

FIG. 3 illustrates exemplary logic for creating an initial database. In a preferred embodiment, a database includes one or more systems. It will be appreciated that the logic of FIG. 3 can be incorporated into the logic of the overall maintenance system shown in FIG. 2, it can be an offline system, or it can be a combination thereof. The logic of FIG. 3 moves from a start block to decision block 120 where a test is made to determine if the database is a derivative of an existing database. Preferably, this determination is made by a user via a suitable user, interface which provides the user with a list of existing databases. If the database is a derivative of an existing database, the logic moves to block 122 where a database is created (i.e., copied) from an existing database. If the database is not a derivative of a single existing database, the logic moves to decision block 124 where a test is made to determine if the database is a derivative of multiple existing databases. Preferably, a user interface allows the user to copy selected portions of data (for example, system data, subsystem data, parts data, function data, etc.) from multiple databases. If the database is to be derived from multiple existing databases, the logic moves to block 126 where a database is created using selected portions of multiple existing databases. If the database is neither a derivative of a single existing database (no in block 120) nor a derivative of multiple existing databases (no in block 124), the logic moves to block 128 where a database is created from scratch. Once the database is created (block 122, block 126 or block 128), the logic of FIG. 3 ends and processing returns to FIG. 2.

Returning to FIG. 2, after a database is identified and created, if required, the logic moves to block 106 where the identified database is opened. Next, in block 108 a main entry screen, such as the one shown in FIG. 12, is displayed.

Figure 12:
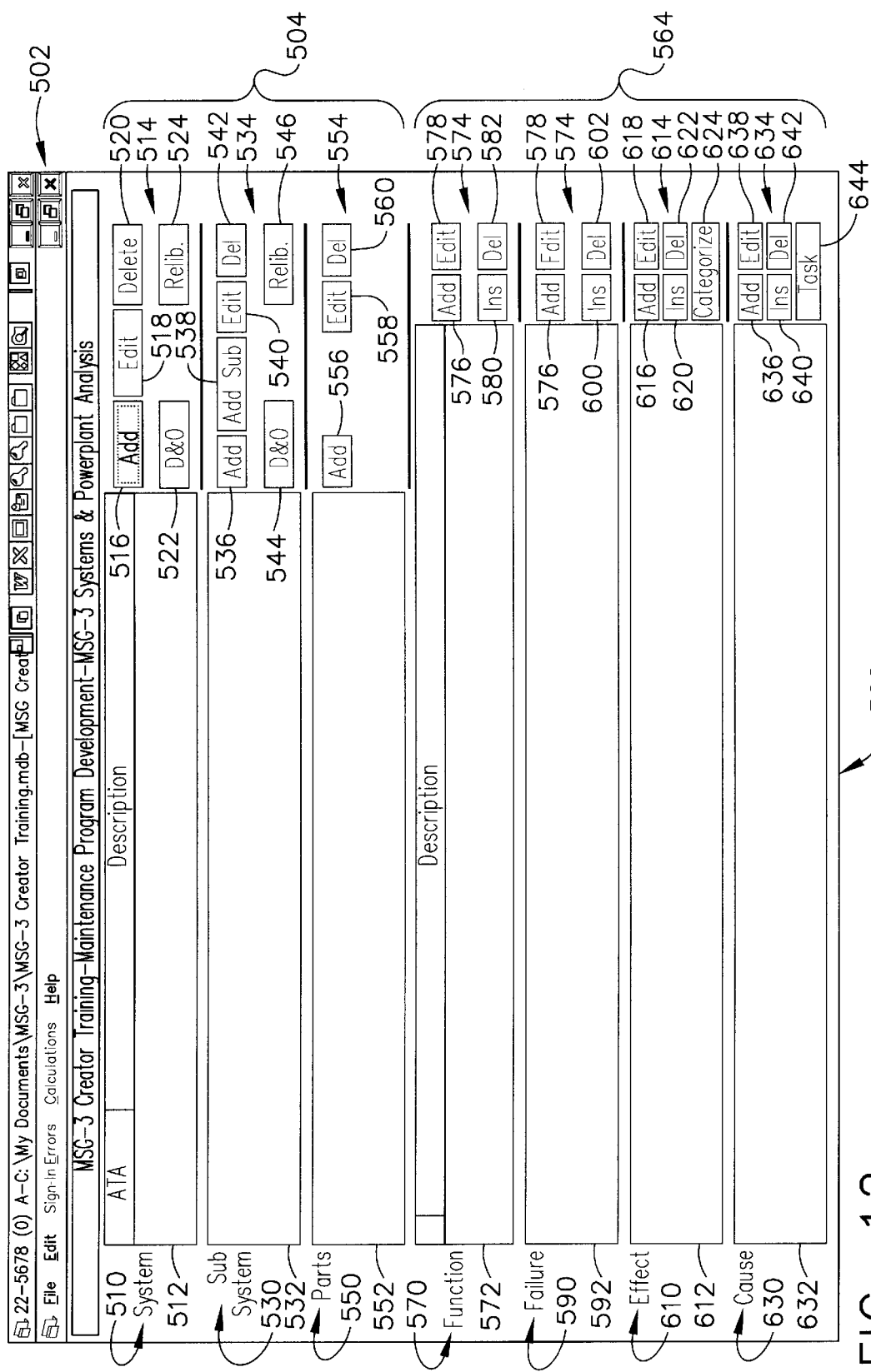
FIG. 12 is an exemplary main entry screen for an empty database.

The exemplary main entry screen 502 shown in FIG. 12 is divided into three sections: a menubar 502; a components section 504; and a functions section 564. The components section 504 is divided into three subsections: a system section 510, a subsystem section 530 and a parts section 550. Each of the subsections is divided into two areas: a list area and a command area. The three subsections contain the four levels of the ATA hierarchy: systems, subsystems, sub-subsystems and parts. Both subsystems and sub-subsystems are included in the subsystem section 550.

System section 510 includes system list area 512 and system command area 514. System list area 512 lists all of the systems in the database. System command area 514 includes a plurality of buttons for invoking system operations. The system command buttons include: an Add button 516, an Edit button 518, a Delete button 520 a D&O (Description & Operation) button 522 and a Reliability button 524. The main entry screen 502 shown in FIG. 12 does not include any data. This exemplifies how a main entry screen would appear if a user elected to create a new database from scratch. Since there is no data in the database, the only function initially available is the add system function which is illustrated in FIG. 12 by virtue of the fact that all of the buttons except the Add system button 516 are grayed-out (i.e., de-activated). It will be appreciated that some menu options, for example, Exit system, are also available (i.e., active) via menubar 502. System operations are described in further detail later with reference to FIG. 5.

Still referring to FIG. 12, subsystem section 530 includes a subsystem list area 532 and a subsystem command area 534. Subsystem list area 532 lists all of the subsystems associated with a selected system. Subsystem command area 534 includes a plurality of buttons for invoking subsystem operations. The subsystem command buttons include: an Add button 536, an Add Sub button 538, an Edit button 540, a Delete button 542 a D&O button 544 and a Reliability button 546. Subsystem operations are described in further detail later with reference to FIG. 6.

Still referring to FIG. 12, parts section 550 includes a parts list area 552 and a parts command area 554. Parts list area 552 lists all of the parts associated with either a selected subsystem or a selected system. Parts command area 554 includes a plurality of buttons for invoking parts operations. The parts command buttons include: an Add button 556, an Edit button 558, and a Delete button 560. Parts operations are described in further detail later with reference to FIG. 7.

Still referring to FIG. 12, functions section 564 is divided into four subsections: a function subsection. 570, a failure subsection 590, an effect subsection 610 and a cause subsection 630. Each of these subsections is divided into two areas: a list area and a command area.

Function subsection 570 includes a function list area 572 and a function command area 574. Function list area 572 lists all of the functions associated with a selected system, subsystem or part. Function command area 574 includes a plurality of buttons for invoking function operations. The function command buttons include: an Add button 576, an Edit button 578, an Insert button 580 and a Delete button 582. Function operations are described in further detail later with reference to FIG. 8.

Still referring to FIG. 12, failure subsection 590 includes a failure list area 592 and a failure command area 594. Failure list area 592 lists all of the failures associated with a selected function. Failure command area 594 includes a plurality of buttons for invoking failure operations. The failure command buttons include: an Add button 596, an Edit button 598, an Insert button 600 and a Delete button 602. Failure operations are described in detail later with reference to FIG. 9.

Still referring to FIG. 12, effect subsection 610 includes an effect list area 612 and an effect command area 614. Effect command area 614 includes a plurality of command buttons including: an Add button 616, an Edit button 618, an Insert button 620, a Delete button 622 and a Categorize button 624. Effect operations are described in detail later with reference to FIG. 10.

Still referring to FIG. 12, cause subsection 630 includes a cause list area 632 and a cause command area 634. Cause command area 634 includes a plurality of command buttons including: an Add button 636, an Edit button 638, an Insert button 640, a Delete button 442 and a Task button 442. Cause operations are described in detail later with reference to FIG. 11.

Referring again to FIG. 2, after the main entry screen is displayed, the logic moves to block 110 to wait for a user request. It will be appreciated that standard programming techniques are utilized, for example, a main processing loop of a graphical user interface program which calls an appropriate callback function based on user input or other events. Next, in decision block 112, a test is made to determine if it is time to exit, for example by the user selecting an Exit mend option from menubar 502. If it is not time to exit, the logic moves to decision block 114 where a test is made to determine if a new database should be opened, for example, by the user selecting a New Database menu item from menubar 502. If a new database should be opened, the logic returns to block 100 where a new database is identified. If a new database should not be opened, the logic moves to block 116 where the user request is processed as illustrated in detail in FIG. 4, described next.

Figure 4:
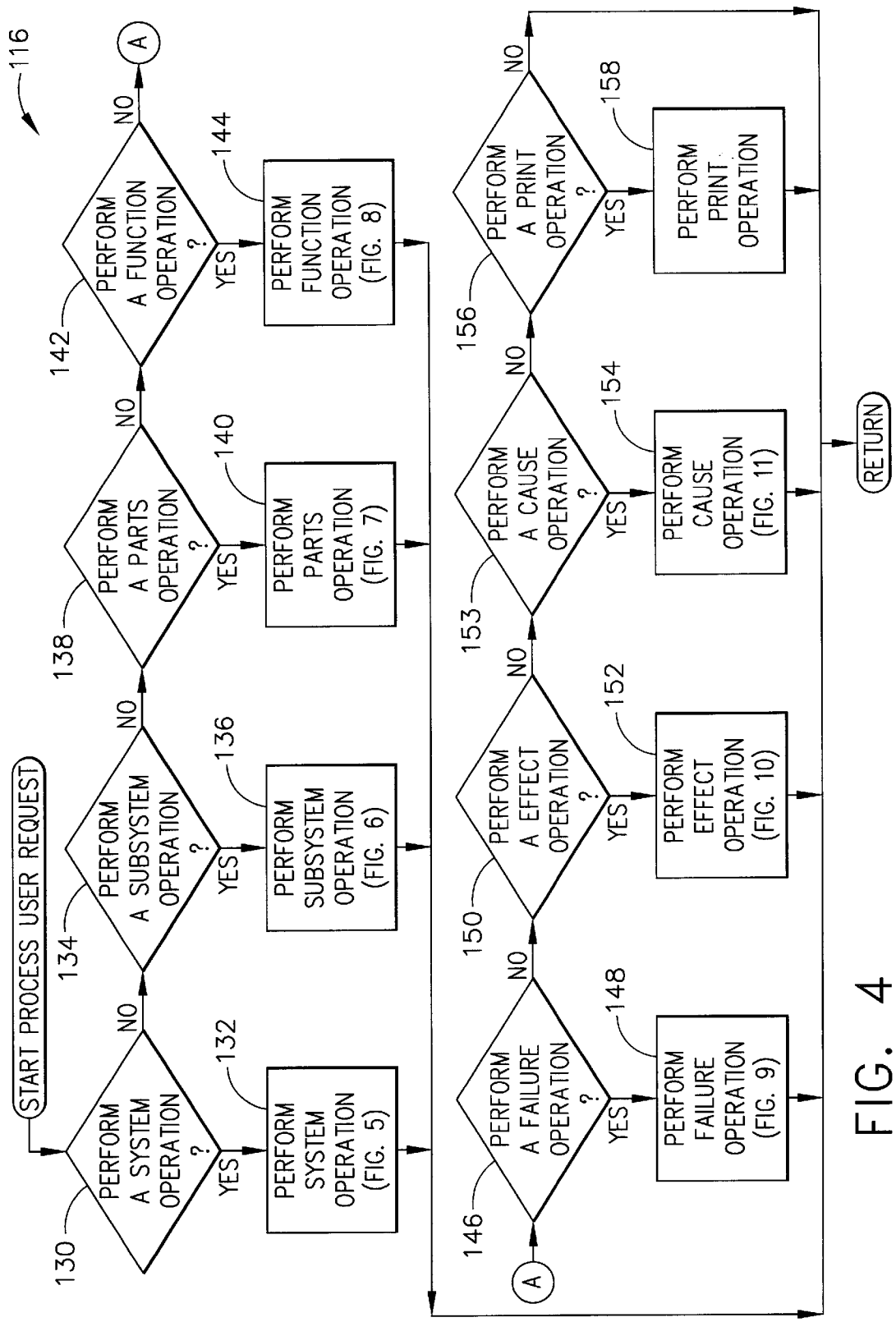
FIG. 4 is a flow diagram illustrating exemplary logic for processing a user request for the maintenance system illustrated in FIG. 2.

FIG. 4 illustrates exemplary logic for performing a user request in accordance with the present invention. As described above, in a preferred implementation of the invention, an appropriate callback function is invoked in response to user input. For ease of understanding, FIG. 4 groups the operations (i.e., functions) together using the hierarchical breakdown of the system as described in the MSG-3. Preferably, the user interface (e.g., FIG. 12) is also broken down using this hierarchical structure. The logic of FIG. 4 moves from a start block to decision block 130 where a test is made to determine is the user request was to perform a system operation. If so, the logic moves to block 132 where the appropriate system operation is, performed as shown in FIG. 5 and described next.

Figure 5:
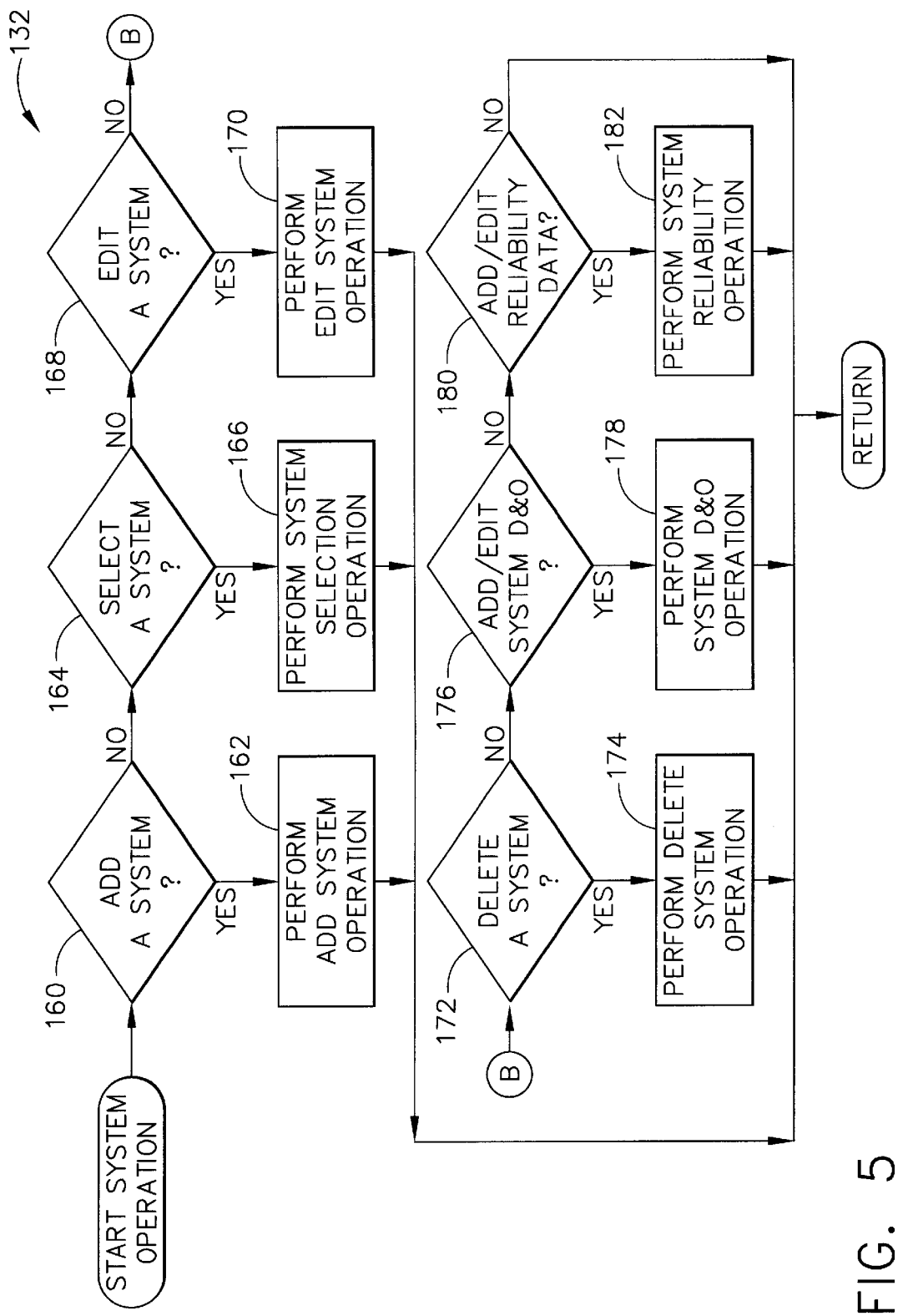
FIG. 5 is a flow diagram illustrating exemplary logic for processing a user request for a system operation.
Figure 13:
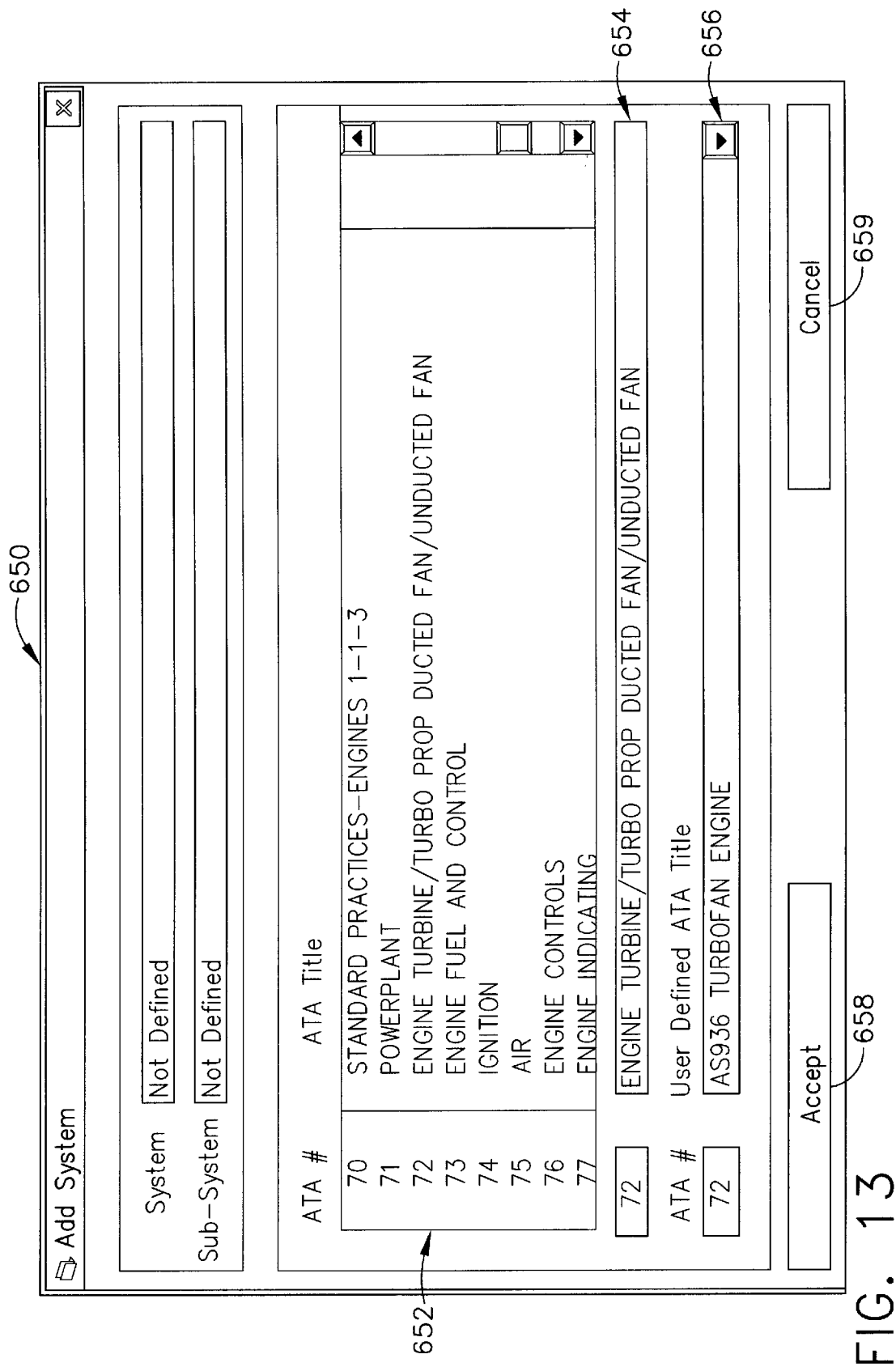
FIG. 13 is an exemplary user interface for adding a system.

FIG. 5 illustrates exemplary logic for performing a system operation. The logic moves from a start block to a decision block 160 where a test is made to determine if the system operation is an add system operation. If so, the logic moves to block 162 where an add system operation is performed. Upon a user request to add a system (e.g., by a user pressing system Add button 516), an Add System user interface, such as the one shown in FIG. 13 is displayed. The Add System user interface 650 includes a list of systems 652. In a preferred embodiment, the list of systems includes all ATA 100 Systems/Chapter Numbers and titles. Preferably, systems which are already in use are grayed-out. The user selects a system to add. In a preferred embodiment, the selected system is displayed in a system selection box 654 and the user can edit the title in an edit box 656, if desired. After the user has made modifications, if desired, the user indicates completion, for example by pressing an Accept button 658 or a Cancel button 659 If the user presses the Accept button 658 the database is updated to reflect the added system. In a preferred embodiment, the user can add multiple systems during an Add System operation.

Referring to FIG. 5, if the system operation was not an add system operation, the logic moves to decision block 164 where a test is made to determine if the operation to be performed is a system selection operation. If so, the logic moves to block 166 where a system selection operation is performed. In order to perform a system selection operation, there must be at least one system in the system list 512. If there are no systems in the system list, the only system operation that can be performed is an add system operation. In a preferred embodiment, the user selects a system, for example by moving a cursor over the desired system name. Preferably, the selected system name is visually highlighted, for example by a highlight bar which displays the selected system in reverse video. The main entry screen is updated based on the user's selection. Any subsystems associated with the selected system are displayed in the subsystem list area 530 and any parts associated with the system are displayed in parts list area 552. Buttons and menu items are enabled and disabled as appropriate. For example, see FIG. 14.

If the system operation was not a system selection operation, the logic moves to decision block 168 where a test is made to determine if the system operation to be performed is an edit system operation. If so, the logic moves to block 170 where a an edit system operation is performed. In order to perform an edit system operation, a system must be selected. Preferably, the edit system operation displays an appropriate user interface which allows the user to modify the title of a selected system.

If the system operation was not an edit system operation, the logic moves to decision block 172 where a test is made to determine if the operation to be performed is a delete system operation. If so, the logic moves to block 174 where a delete system operation is performed. A system must be selected prior to performing a delete system operation. Preferably, the user confirms the system to be deleted. The database is updated to remove the system, and any sub-systems and parts associated with the system as well as functions, failures and causes.

If the requested system operation was not a delete system operation, the logic moves to decision block 176 where a test is made to determine if the operation to be performed is a system D&O operation. If so, the logic moves to block 178 where a system D&O operation is performed. The D&O operation allows the user to add or edit System Description and Operation information. In a preferred embodiment, existing D&O information, can be imported, for example from a Microsoft Word file. Preferably, the D&O information can be updated, for example, by editing the Word file and re-importing it.

Figure 15:
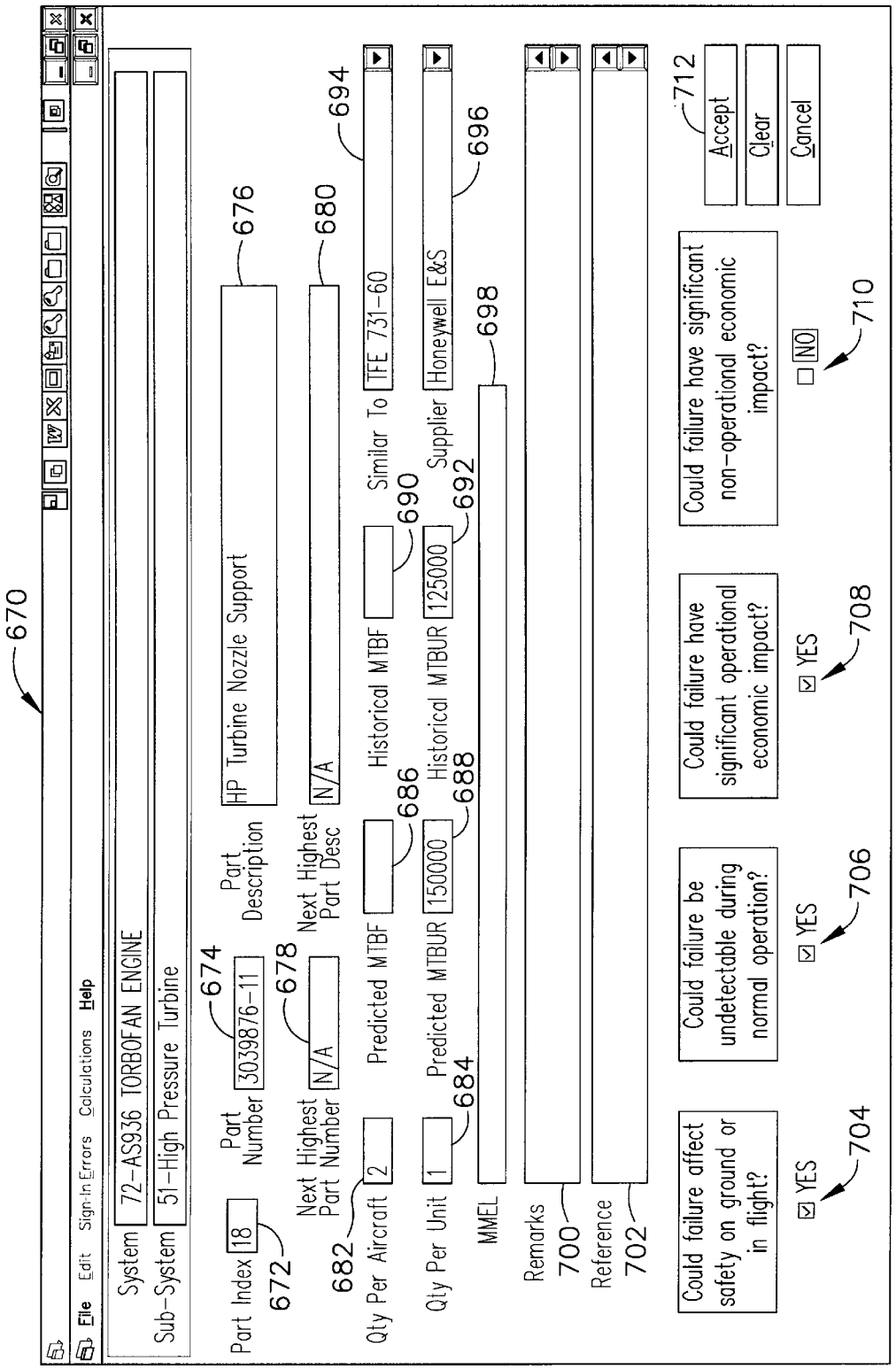
FIG. 15 is an exemplary user interface for entering information for a part.

If the system operation is not a D&O operation, the logic moves to decision block 180 where a test is made to determine if the operation to be performed is a system reliability operation. If so, the logic moves to block 182 where a system reliability function is performed. A system reliability function allows the user to enter system reliability data. An exemplary screen for entering system reliability data for parts is shown in FIG. 15. In a preferred embodiment, the reliability information entered for a system is the same information entered for a part except that there are no index or description fields for system reliability data. The reliability information is explained in further detail later with reference to entering data for a part. Preferably, reliability information automatically rolls up to the system level. For example, if a part has a potential failure that could affect safety, then any higher level (e.g., sub-subsystem, subsystem or system) that includes that part, either directly or indirectly, will also have a potential failure that could affect safety. After the appropriate system operation (e.g., add, select, edit, delete, D&O or reliability) has been performed, the logic of FIG. 5 ends and processing returns to FIG. 4.

Returning to FIG. 4, if the operation to be performed is not a system operation, the logic moves to decision block 134 where a test is made to determine if the user request was to perform a subsystem operation. If so, the logic moves to block 136 where the appropriate subsystem operation is performed as shown in FIG. 6 and described next.

Figure 6:
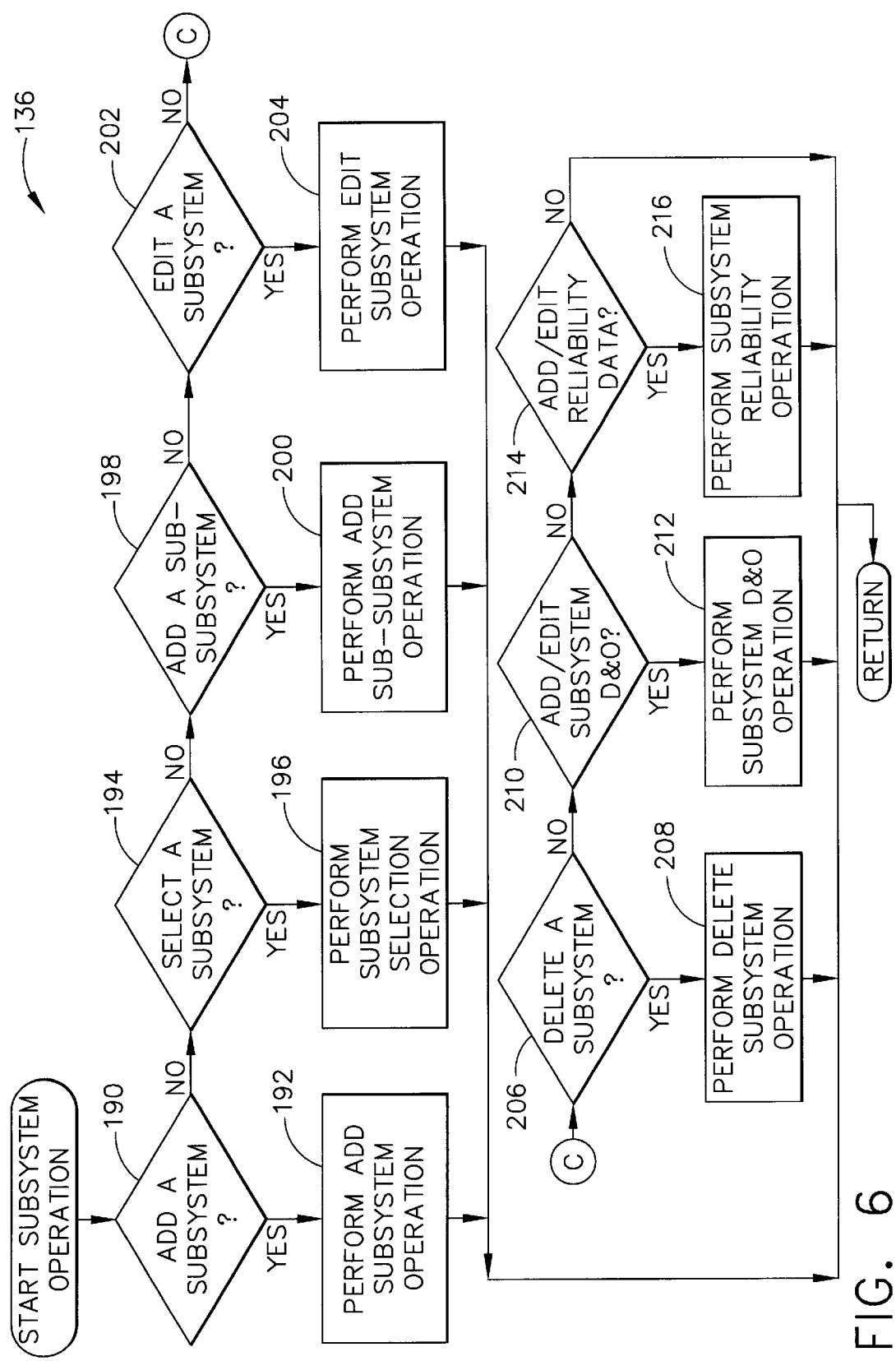
FIG. 6 is a flow diagram illustrating exemplary logic for processing a user request for a subsystem operation.

FIG. 6 illustrates exemplary logic for performing a subsystem operation. "Subsystems" include subsystems and sub-subsystems. A sub-subsystem is a subsystem that is included in another subsystem. The logic moves from a start block to a decision block 190 where a test is made to determine if the subsystem operation is an add subsystem operation. If so, the logic moves to block 192 where an add subsystem operation is performed. Prior to adding a subsystem, the user must select a system to which the subsystem is to be added. After selecting a system and pressing the Add Subsystem button 536, an Add Subsystem user interface is displayed. Preferably, the Add Subsystem interface is similar to the Add System user interface shown in FIG. 13 and described above.

If the subsystem operation was not an add subsystem operation, the logic moves to decision block 194 where a test is made to determine if the operation to be performed is a subsystem selection operation. If so, the logic moves to block 196 where a subsystem selection operation is performed. In order to perform a subsystem selection operation, there must be at least one subsystem in subsystem list 532. Preferably, the user selects a subsystem, for example by moving a cursor over the desired subsystem entry in the subsystem list 532. Preferably, the selected subsystem is visually highlighted, for example by a highlight bar which displays the selected subsystem in reverse video. The main entry screen is updated based on the user's selection. Any parts associated with the selected subsystem are displayed in the parts list area 550. Buttons and menu items are enabled and disabled as appropriate.

If the subsystem operation was not a subsystem selection operation, the logic moves to decision block 198 where a test is made to determine if the subsystem operation to be performed is an add sub-subsystem operation. If so, the logic moves to block 200 where an add sub-subsystem operation is performed. In order to add a sub-subsystem (i.e., a subsystem that is included in another subsystem), a system and a subsystem must be selected. After selecting a system and a subsystem and pressing the Subsystem Add Sub button 538, an Add Sub-subsystem user interface is displayed. Preferably, the Add Sub-Subsystem user interface is similar to the Add System user interface shown in FIG. 13 and described above.

If the subsystem operation was not an add sub-subsystem operation, the logic moves to decision block 202 where a test is made to determine if the subsystem operation is an edit operation. If so, the logic moves to block 204 where an edit subsystem operation is performed. The edit subsystem operation can be performed on subsystems and sub-subsystems. In order to perform a subsystem edit operation, a subsystem must be selected. Preferably, the Subsystem Edit operation displays an appropriate user interface which allows the user to modify the title of a selected subsystem.

If the subsystem operation was not an edit subsystem operation, the logic moves to decision block 206 where a test is made to determine if the operation to be performed is a delete subsystem operation. Both subsystems and sub-subsystems can be deleted using the delete subsystem operation. If the desired operation is a delete subsystem operation, the logic moves to block 208 where a subsystem delete operation is performed. A subsystem must be selected prior to performing a subsystem delete operation. Preferably, the user confirms the subsystem to be deleted. The database is updated to remove the subsystem, including any sub-subsystems or parts associated with the subsystem, as well as functions, failures and causes.

If the subsystem operation was not a delete subsystem operation, the logic moves to decision block 210 where a test is made to determine if the operation to be performed is a subsystem D&O operation. If so, the logic moves to block 212 where a subsystem D&O operation is performed. The D&O operation allows the user to add or edit Subsystem Description and Operation information. In a preferred embodiment, existing D&O information, can be imported, for example from a Microsoft Word file. Preferably, the D&O information can be updated, for example, by editing the Word file and re-importing it or by directly editing the information in the database.

If the subsystem operation is not a D&O operation, the logic moves to decision block 214 where a test is made to determine if the operation to be performed is a subsystem reliability operation. If so, the logic moves to block 216 where a subsystem reliability function is performed. A subsystem reliability function allows the user to enter subsystem reliability data. Preferably, the same user interface for entering system reliability data is used for entering subsystem reliability information. ,Preferably, reliability information automatically rolls up to the subsystem level. The subsystem reliability information rolls up to the system level. After the appropriate subsystem operation (e.g., add subsystem, select, add sub-subsystem, edit, delete, D&O or reliability) has been performed, the logic of FIG. 6 ends and processing returns to FIG. 4.

Returning to FIG. 4, if the operation to be performed is not a subsystem operation, the logic moves to decision block 138 where a test is made to determine if the user request was to perform a parts operation. If so, the logic moves to block 140 where the appropriate parts operation is performed as shown in FIG. 7 and described next.

Figure 7:
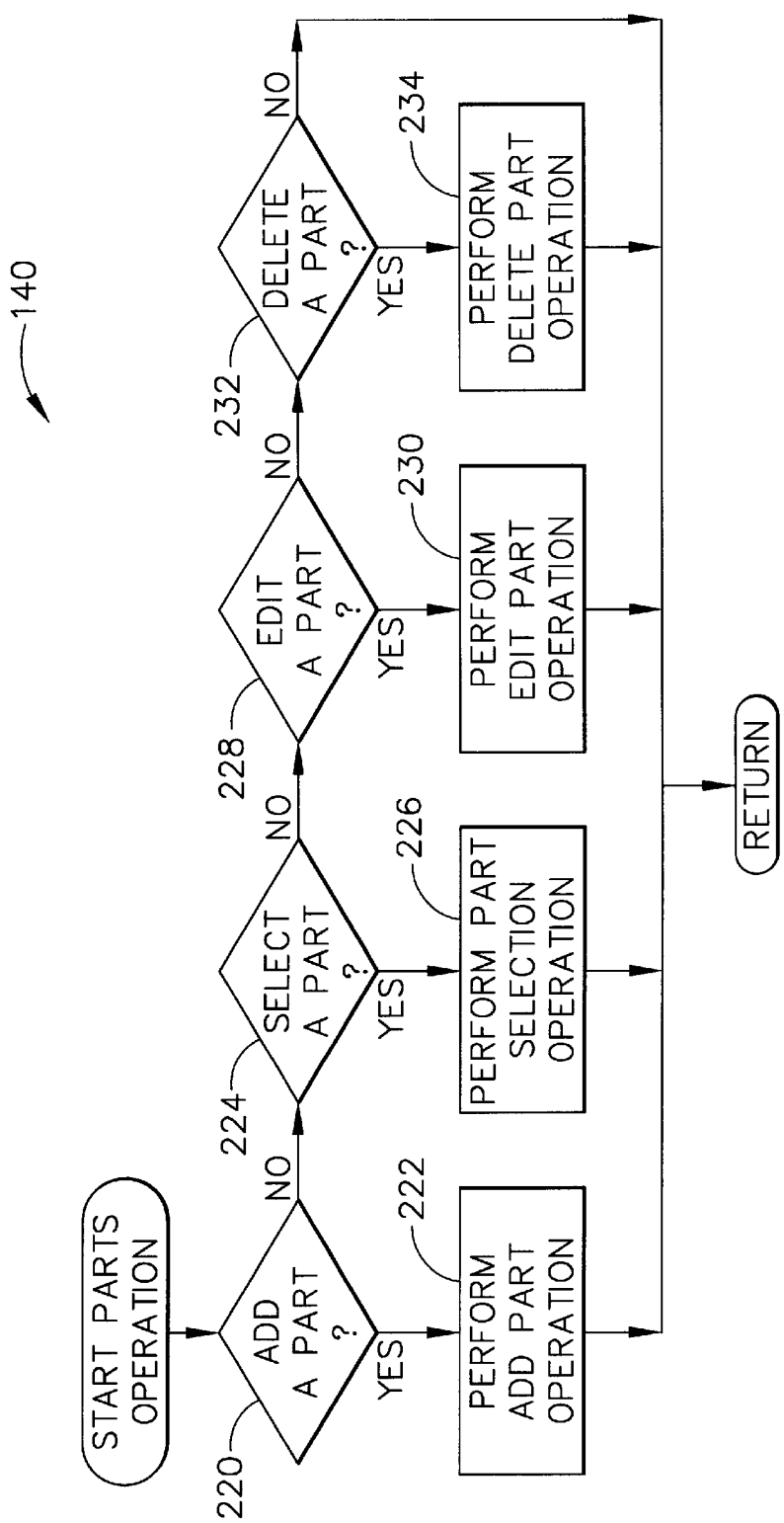
FIG. 7 is a flow diagram illustrating exemplary logic for processing a user request for a parts operation.

FIG. 7 illustrates exemplary logic for performing a parts operation. The logic moves from a start block to decision block 220 where a test is made to determine if the parts operation is an add part operation. If so, the logic moves to block 222 where an add part operation is performed. Upon a user request to add a part, an Add Part user interface, such as the one shown in FIG. 15 is displayed. Parts can only be added at the level at which the analysis is to be performed. As previously discussed, this should be the highest manageable level as determined in MSI selection. Prior to pressing the parts Add button 556, the user must select the system, subsystem or sub-subsystem to which the part is to be added. The Add parts user interface 670 shown in FIG. 15 allows the user to enter information in the following fields: part index 672; part number 674, part description 676, next highest part number 678; next highest part description 680; quantity per aircraft 682; quantity per unit 684, predicted MTBF 686; predicted MTBUR 688; historical MTBF 690; historical MTBUR 692; Similar To 694; Supplier 696; MMEL 698, Remarks 700; and Reference 702. The part index may be an index to an Engineering Drawing, a Parts Manual, an arbitrary number selected by the analyst or some other number used by the manufacturer to designate the individual parts of a system, subsystem or sub-subsystem. The Part Number can include both the aircraft manufacturer's and equipment supplier's part numbers. Preferably, a separator (e.g., "/") is used to separate the numbers if both an aircraft manufacturer's and equipment supplier's part numbers are entered in the Part Number field 674. The Part Description field 676 is used to describe the function and/or location of the part within the MSI. The Next Highest Part Number and the Next Highest Part Description are not required, but may be entered for reference by an analyst. The Quantity Per Aircraft is the total quantity of an item within the MSI. For example, if there are two redundant systems and each system has two identical valves, the entry would be four. The Quantity Per Unit is not required, but may be entered for reference by an analyst. The Predicted MTBF (mean time between failures) is not required, but may be entered for reference by an analyst. The Predicted MTBUR is an engineering prediction of Mean Time Between Unscheduled Removals for an item of equipment. The historical MTBF is not required, but may be entered by an analyst. The historical MTBUR is the historical mean time between unscheduled removal for this or a similar item when used on another piece of equipment in a similar environment. The Similar To field 694 is used to reference equipment which includes a similar item, used in a similar environment that was used as a design baseline for this item. Preferably, this field is in the format of a look-up list. The Supplier Field indicates the manufacturer or distributor of the item. Preferably the user can select the manufacturer or distributor from a look-up list. The MMEL field is for the Master Minimum Equipment List which indicates whether the aircraft may be dispatched with this equipment non-operational. A Remarks field can be used to explain or justify other entries. The Reference field allows the entry of additional data that may be required to support other data entered applicable to a system, subsystem or component.

The parts user interface 670 also includes the following four MSI Selection Questions:
1. Could failure affect safety on ground or in flight?
2. Could failure be undetectable during normal operation?
3. Could failure have a significant operational economic impact?
4. Could failure have significant non-operational economic impact?

The user enters answers to these questions using the appropriate answer checkboxes 704, 706, 708 and 710. After the user has entered the desired data, the user can update the database by pressing an Accept button 712.

Referring again to FIG. 7, if the parts operation is not an add operation, the logic moves to decision block 224 where a test is made to determine if the operation to be performed is a part selection operation. If so, the logic moves to block 226 where a part selection operation is performed. In order to perform a part selection operation, there must be at least one part for the selected system, subsystem or sub-subsystem. If there are no parts in the parts list 554, the only parts operation that can be performed is an add part operation as described above. In order to select a part, the user selects a system. Upon selecting a system, the display is updated to show the subsystems, sub-subsystems and parts associated with the selected system. The user may then select a part, a subsystem or a sub-subsystem. If a subsystem or sub-subsystem is selected, the display is updated to list the sub-subsystems and parts included in the selected subsystem or sub-subsystem. The user can select a part from the parts list 554 after selecting a system, subsystem or sub-subsystem in which the part is included. After selecting a part, the display is updated to reflect the selected part (e.g., highlight the selected part using reverse video) and to enable and disable buttons and menu items as appropriate.

If the parts operation was not a part selection operation, the logic moves to decision block 228 where a test is made to determine if the parts operation to be performed is an edit part operation. If so, the logic moves to block 230 where an edit part operation is performed. In order to perform an edit part operation, a part must be selected. Preferably, the edit part operation displays the same screen that was used for adding parts data, for example, see FIG. 15.

If the system operation was not an edit part operation, the logic moves to decision block 232 where a test is made to determine if the operation to be performed is a delete part operation. If so, the logic moves to block 234 where a delete part operation is performed. A part must be selected prior to performing a delete part operation. Preferably, the user confirms the part to be deleted. The database is updated to remove the part. After the appropriate parts operation (e.g., add, select, edit, or delete) has been performed, the logic of FIG. 7 ends and processing returns to FIG. 4.

Returning to FIG. 4, if the operation to be performed is not a parts operation, the logic moves to decision block 142 where a test is made to determine if the user request was to perform a function operation. If so, the logic moves to block 144 where the appropriate function operation is performed as shown in FIG. 8 and described next.

Figure 8:
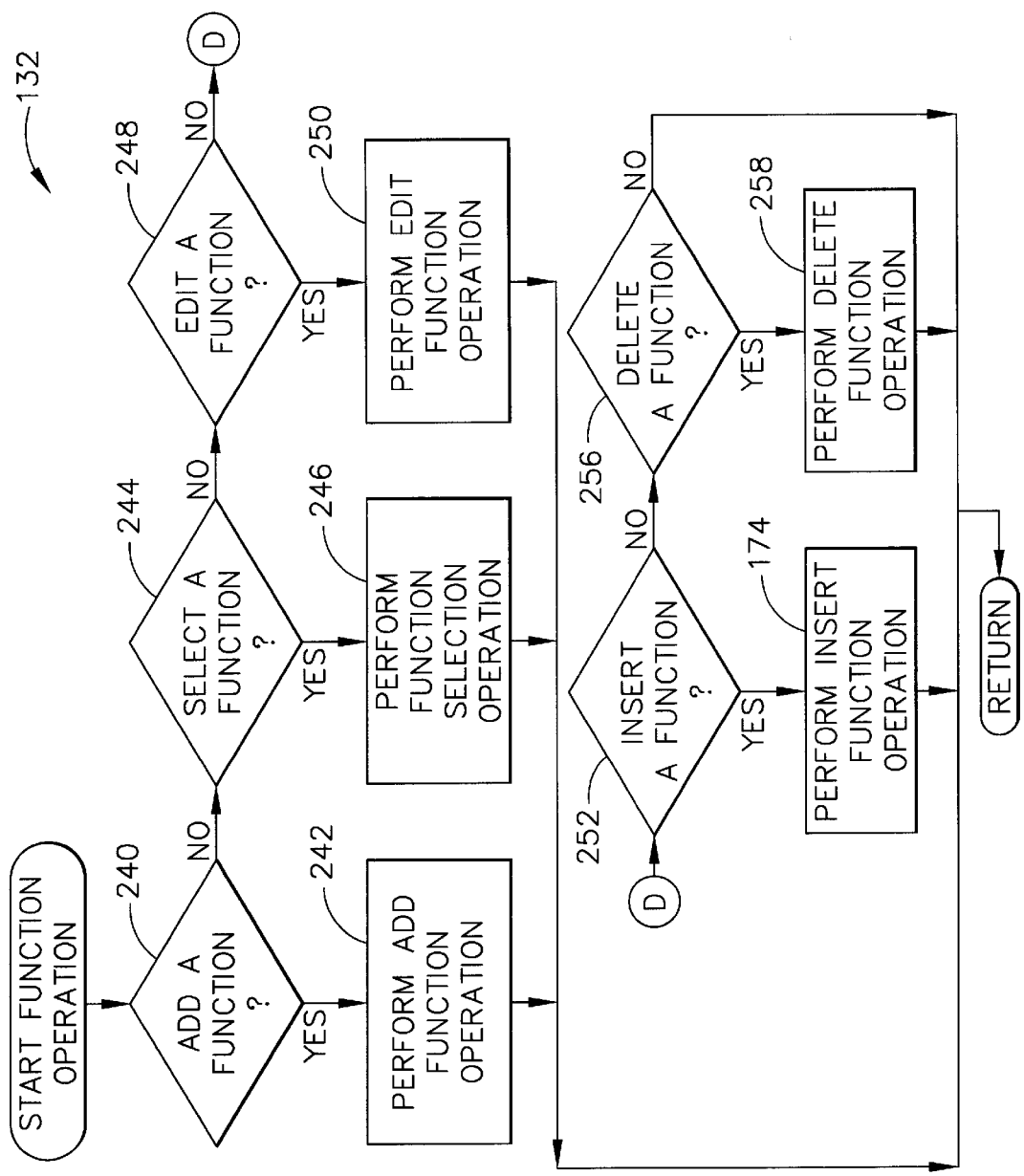
FIG. 8 is a flow diagram illustrating exemplary logic for processing a user request for a function operation.
Figure 16:
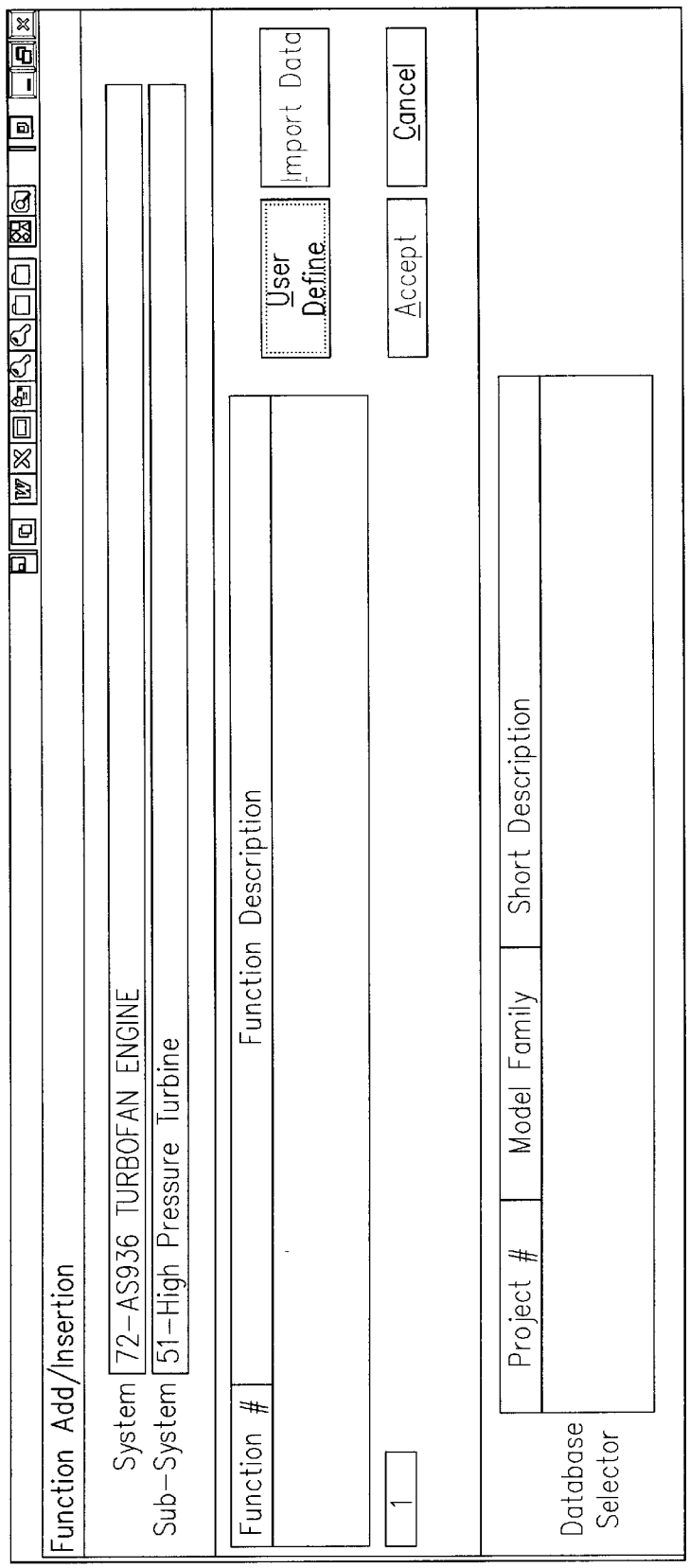
FIG. 16 is an exemplary user interface for entering function information.

FIG. 8 illustrates exemplary logic for performing a function operation. MSG-3 requires that a detailed, top-down, functional failure analysis be conducted for each MSI. The first step is to determine all of the functions of the MSI. Functions should include direct or primary functions of the MSI and can also include secondary or subsidiary functions of the MSI. The logic of FIG. 8 moves from a start block to decision block 240 where a test is made to determine if the operation to be performed is an add function operation. If there are no functions, the only function operation that can be performed is an add function operation. If the operation to be performed is an add function operation, the logic moves to block 242 where an add function operation is performed. Prior to adding a function, the component (e.g., system, subsystem or sub-subsystem) which has been determined to be the MSI must be selected. Upon selection of an add function operation, a user interface screen, such as the one shown in FIG. 16 is displayed. The user enters a function and a function description using the entry screen shown in FIG. 16. Upon completion (e.g., pressing an accept button), the database is updated. The main entry display is updated to include the new functions and enable/disable buttons and menu items as appropriate.

Referring to FIG. 8, if the requested function operation is not an add function operation, the logic moves to decision block 244 where a test is made to determine if the operation is a function selection operation. If so, the logic moves to block 246 where a function selection operation is performed. Upon the user's indication of a function (e.g., by moving the cursor over the desired function), the selected function is highlighted and the display is updated to enable/disable buttons and menu items as appropriate. Preferably, functions can be imported from other systems in the database.

If the desired function operation is not a select function operation, the logic moves to decision block 248 where a test is made to determine if the desired function operation is an edit function operation. If so, the logic moves to block 250 where an edit function operation is performed. The edit function operation displays a user interface suitable for editing a function. The user interface allows the user to modify the previously entered description for the selected function.

If the desired operation is not an edit operation, the logic moves to decision block 252 where a test is made to determine if the desired function operation is an insert function operation. If so, the logic moves to block 254 where an insert function operation is performed. In a preferred embodiment, an insert function operation is the same as an add function operation except that an insert function operation adds the new function at a user-specified location the function list, whereas an add function operation adds the new function to the end of the function list.

If the desired operation is not an insert function operation, the logic moves to decision block 256 where a test is made to determine if the desired operation is a delete function operation. If so, the logic moves to block 258 where a delete function operation is performed. Preferably, the user verifies the deletion of the selected function. Upon verification, the database is updated to delete the function from the system. Preferably, failures, effects, causes and tasks associated with the deleted function will also be deleted. After the desired function operation has been performed (e.g., add, select, edit, insert or delete), the logic of FIG. 8 ends and processing returns to FIG. 4.

Returning to FIG. 4, if the operation to be performed is not a function operation, the logic moves to decision block 146 where a test is made to determine if the user request was to perform a failure operation. If so, the logic moves to block 148 where the appropriate failure operation is performed as shown in detail in FIG. 9 and described next.

Figure 9:
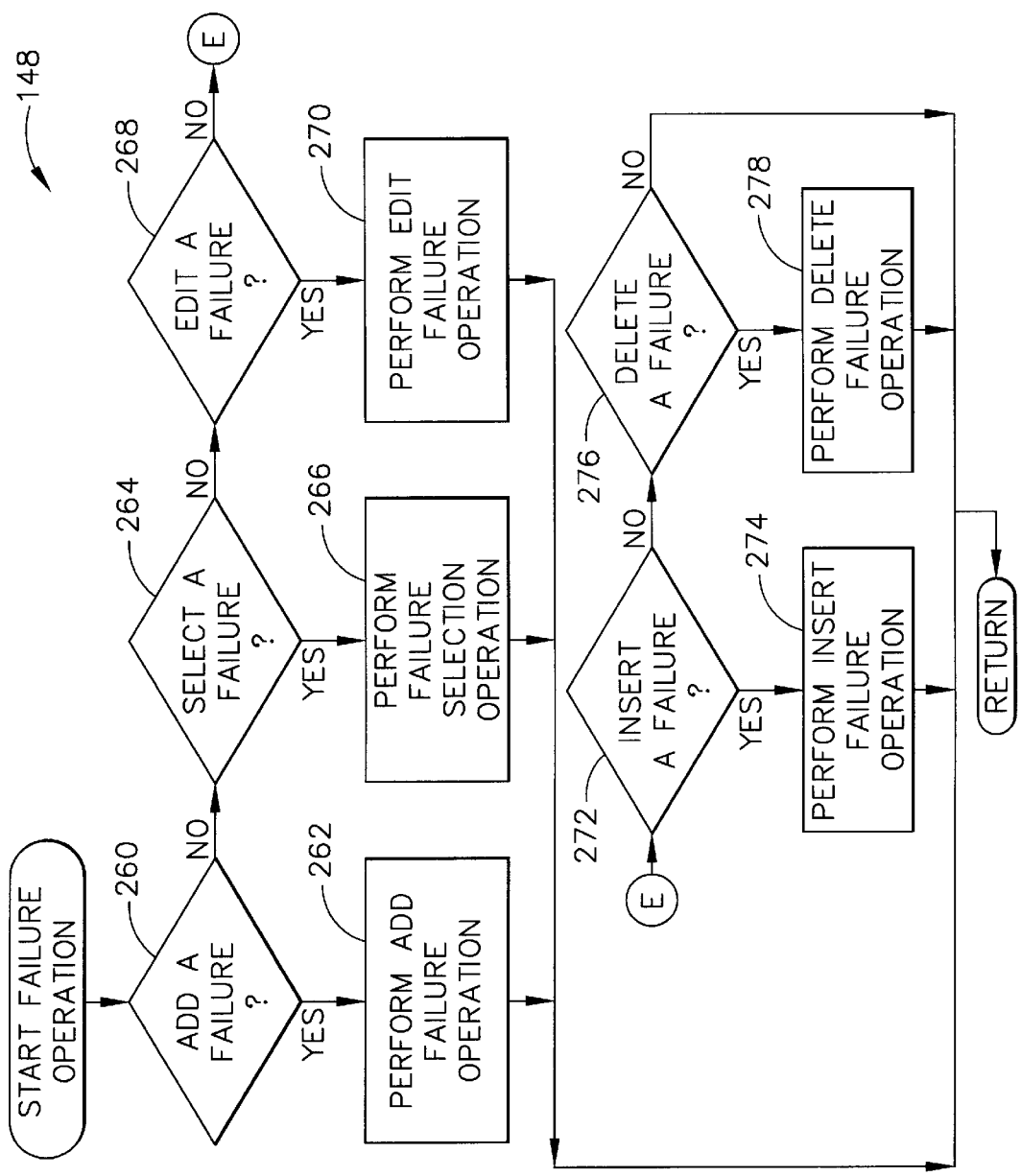
FIG. 9 is a flow diagram illustrating exemplary logic for processing a user request for a failure operation.

FIG. 9 illustrates exemplary logic for performing a failure operation. The logic moves from a start block to decision block 260 where a test is made to determine if the operation to be performed is an add failure operation. If there are no failures for the selected function, the only function operation that can be performed is an add failure operation. If the operation to be performed is an add failure operation, the logic moves to block 262 where an add failure operation is performed. Prior to adding a failure, a function must be selected. Upon selection of a function, a user interface screen, similar to the Add function user interface screen is displayed. The user enters a failure using the Add failure user interface. Upon completion (e.g., pressing an accept button), the database is updated. The main entry display is updated to include the new failures.

If the requested failure operation is not an add failure operation, the logic moves to decision block 264 where a test is made to determine if the operation is a failure selection operation. If so, the logic moves to block 266 where a failure selection operation is performed. Upon the user's selection of a failure (e.g., by moving the cursor over the desired failure), the selected failure is highlighted and the display is updated to enable/disable buttons and menu items as appropriate.

If the desired failure operation is not a select failure operation, the logic moves to decision block 268 where a test is made to determined if the desired failure operation is an edit failure operation. If so, the logic moves to block 270 where an edit failure operation is performed. The edit failure operation displays a user interface suitable for editing a failure. The user interface allows the user to modify the previously entered description for the selected failure.

If the desired operation is not an edit operation, the logic moves to decision block 272 where a test is made to determine if the desired failure operation is an insert failure operation. If so, the logic moves to block 274 where an insert failure operation is performed. In a preferred embodiment, an insert failure operation is the same as an add failure operation except that an insert failure operation adds the new failure at a user-specified location in the failure list, whereas an add failure operation adds the new failure to the end of the failure list.

If the desired operation is not an insert failure operation, the logic moves to decision block 276 where a test is made to determine if the desired operation is a delete failure operation. If so, the logic moves to block 278 where a delete failure operation is performed. Preferably, the user verifies the deletion of the selected failure. Upon verification, the database is updated to delete the failure from the system. Preferably, effects, causes and tasks associated with the deleted failure are also deleted. After the desired failure operation has been performed (e.g., add, select, edit, insert or delete), the logic of FIG. 9 ends and processing returns to FIG. 4.

Returning to FIG. 4, if the operation to be performed is not a failure operation, the logic moves to decision block 150 where a test is made to determine if the user request was to perform an effect operation. If so, the logic moves to block 152 where the appropriate effect operation is performed as shown fin detail in FIG. 10 and described next.

Figure 10:
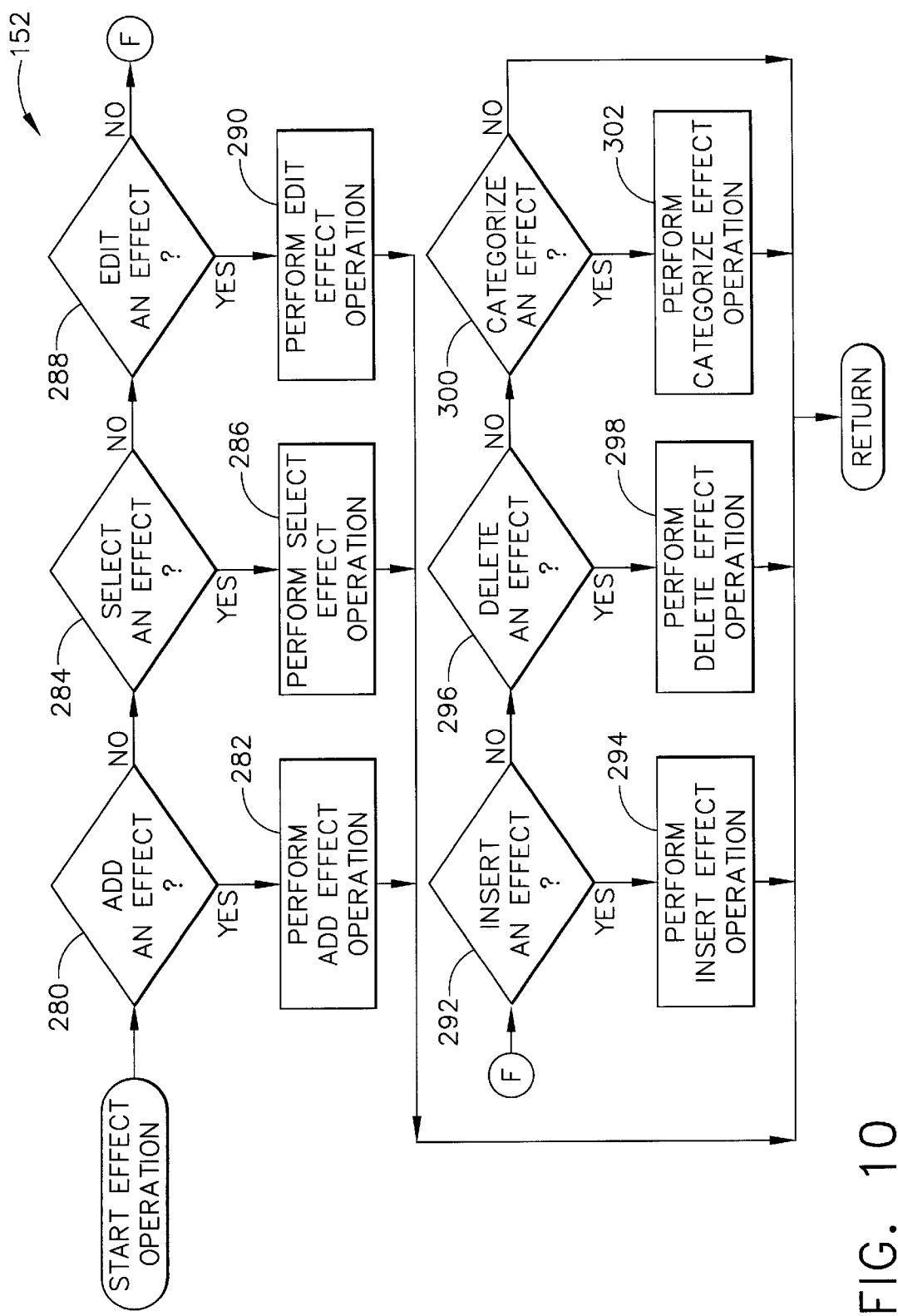
FIG. 10 is a flow diagram illustrating exemplary logic for processing a user request for a effect operation.

FIG. 10 illustrates exemplary logic for performing an effect operation. The logic moves from a start block to decision block 280 where a test is made to determine if the operation to be performed is an add effect operation. If there are no effects for the selected failure, the only effect operation that can be performed is an add effect operation. If the operation to be performed is an add effect operation, the logic moves to block 282 where an add effect operation is performed. Prior to adding an effect, a failure must be selected. Upon selection of an add failure, a user interface screen, similar to the Add function user interface screen is displayed. The user enters an effect using the Add Effect user interface. Upon completion (e.g., pressing an accept button), the database is updated. The main entry display is updated to include the new effects and enable/disable buttons and menu items as appropriate.

If the requested effect operation is not an add effect operation, the logic moves to decision block 284 where a test is made to determine if the operation is an effect selection operation. If so, the logic moves to block 286 where an effect selection operation is performed. Upon the user's selection of an effect (e.g., by moving the cursor over the desired effect), the selected effect is highlighted and the display is updated to enable/disable buttons and menu items as appropriate.

If the desired effect operation is not a select effect operation, the logic moves to decision block 288 where a test is made to determine if the desired effect operation is an edit effect operation. If so, the logic moves to block 290 where an edit effect operation is performed. The edit effect operation displays a user interface suitable for editing an effect. The user interface allows the user to modify the previously entered description for the selected effect.

If the desired operation is not an edit operation, the logic moves to decision block 292 where a test is made to determine if the desired effect operation is an insert effect operation. If so, the logic moves to block 294 where an insert effect operation is performed. In a preferred embodiment, an insert effect operation is the same as an add effect operation except that an insert effect operation adds the new effect at a user-specified location in the effect list, whereas an add effect operation adds the new effect to the end of the effect list.

If the desired operation is not an insert effect operation, the logic moves to decision block 296 where a test is made to determine if the desired operation is a delete effect operation. If so, the logic moves to block 298 where a delete effect operation is performed. Preferably, the user verifies the deletion of the selected effect. Upon verification, the database is updated to delete the effect from the system. Preferably, causes and tasks associated with the deleted effect are also deleted.

Figure 17:
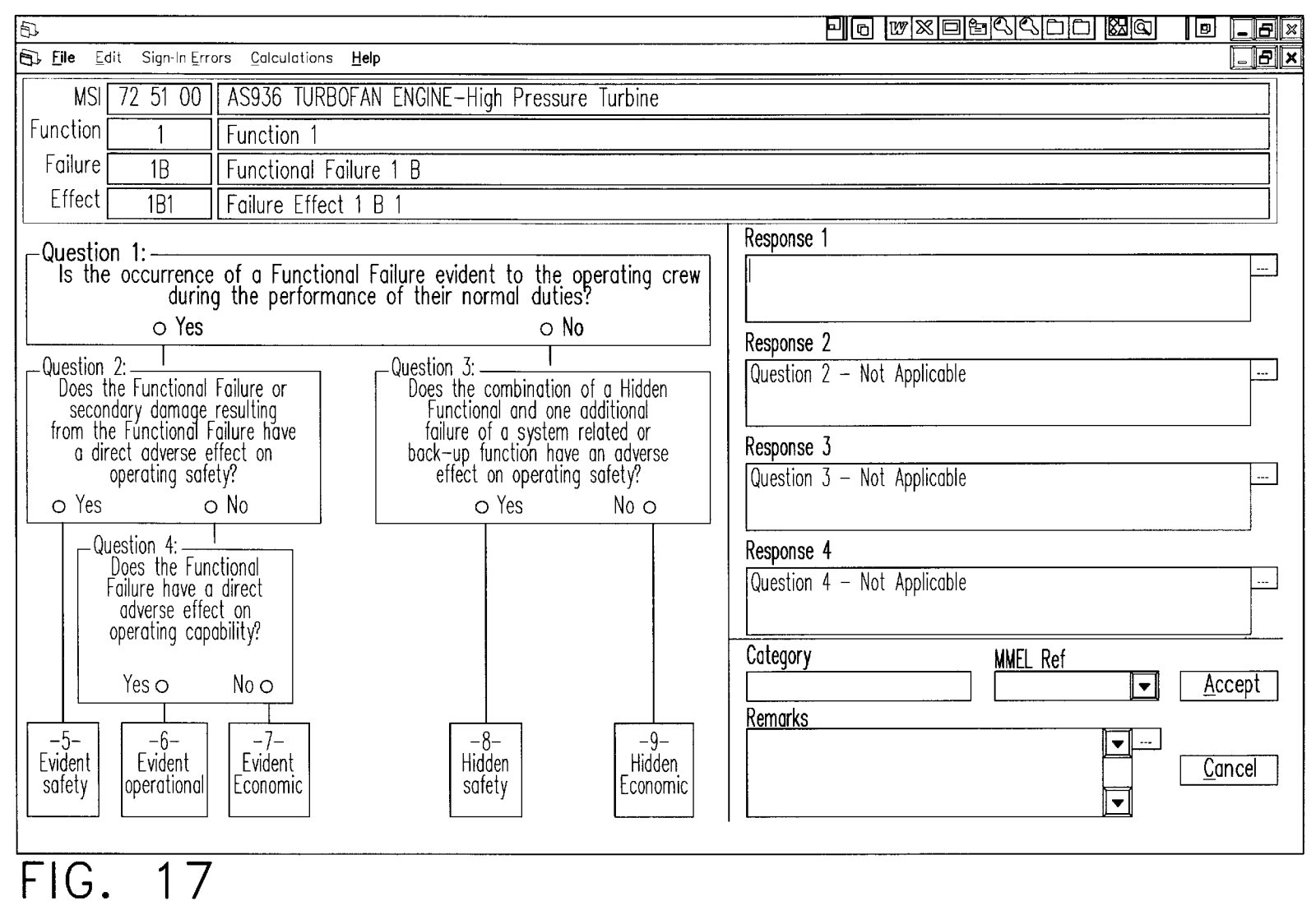

If the desired operation is not a delete effect operation, the logic moves to decision block 300 where a test is made to determine if the desired operation is a categorize effect operation. If so, the logic moves to block 312 where a categorize effect operation is performed. In order to categorize an effect, the user answers a series of questions using a user interface such as the one shown in FIG. 17. Question 1 asks if the occurrence of a functional failure is evident to the operating crew during the performance of their normal duties. This question must be asked for each functional failure effect of the item being analyzed. A "yes" answer to this question indicates that the functional failure effect is evident and question 2 must be answered. Question 2 asks if the functional failure or secondary damage resulting from the functional failure will have a direct adverse effect on operating safety. An adverse impact on safety implies that the consequences are extremely serious or possibly catastrophic and might cause the loss of an aircraft or injury to occupants. Operating refers to the time interval during which passengers and crew are on board for the purpose of flight. A "yes" answer to question 2 indicates that the failure effect falls into the evident safety failure category. A "no" answer to question 2 indicates that the effect is either operational or economic and an answer to question 4 is required. Question 4 asks if the functional failure has a direct adverse effect on operating capability. If the answer to question 4 is "yes," the functional failure effect is categorized as an evident operational failure. If the answer to question 4 is "no," the failure effect is categorized as an evident economic failure. If the answer to question 1 is "no," the failure is hidden and question 3 is asked. Question 3 asks if the combination of a hidden functional failure and one additional failure of a system related or backup function have an adverse effect on operating safety. If the answer to question 3 is "yes," the failure effect is categorized as a hidden safety failure. If the answer to question 3 is "no," the failure effect is categorized as a hidden economic failure.

After the desired effect operation has been performed (e.g., add, select, edit, insert, delete or categorize), the logic of FIG. 10 ends and processing returns to FIG. 4.

Returning to FIG. 4, if the operation to be performed is not an effect operation, the logic moves to decision block 153 where a test is made to determine if the operation to be performed is a cause operation. If so, the logic moves to block 154 where the appropriate cause operation is performed as shown in detail in FIG. 11 and described next.

Figure 11:
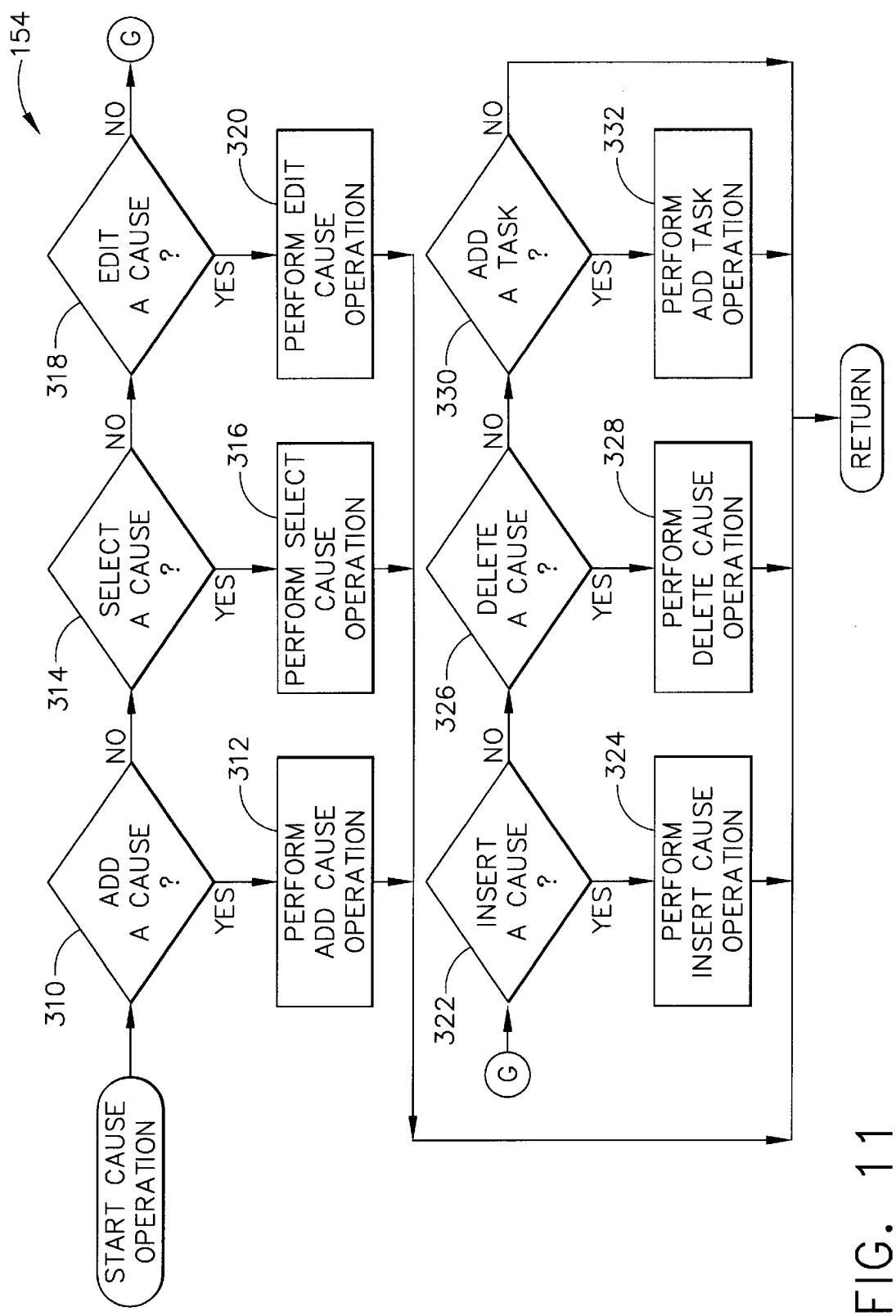
FIG. 11 is a flow diagram illustrating exemplary logic for processing a user request for a cause operation.

FIG. 11 illustrates exemplary logic for performing a cause operation. The logic moves from a start block to decision block 310 where a test is made to determine if the operation to be performed is an add cause operation. If there are no causes for the selected effect, the only cause operation that can be performed is an add cause operation. If the operation to be performed is an add cause operation, the logic moves to block 312 where an add cause operation is performed. Prior to adding a cause, an effect must be selected. Upon selection of an effect, an Add Cause user interface screen, similar to the Add function user interface screen is displayed. The user enters a cause using the Add Cause user interface. Upon completion (e.g., pressing an accept button), the database is updated. The main entry display is updated to include the new cause.

If the requested cause operation is not an add cause operation, the logic moves to decision block 314 where a test is made to determine if the operation is a cause selection operation. If so, the logic moves to block 316 where a cause selection operation is performed. Upon the user's selection of a cause (e.g., by moving the cursor over the desired cause), the selected cause is highlighted and the display is updated to enable/disable buttons and menu items as appropriate.

If the desired cause operation is not a select cause operation, the logic moves to decision block 318 where a test is made to determine if the desired cause operation is an edit cause operation. If so, the logic moves to block 320 where an edit cause operation is performed. The edit cause operation displays a user interface suitable for editing a cause. The user interface allows the user to modify the previously entered description for the selected cause.

If the desired operation is not an edit operation, the logic moves to decision block 322 where a test is made to determine if the desired cause operation is an insert cause operation. If so, the logic moves to block 324 where an insert cause operation is performed. In a preferred embodiment, an insert cause operation is the same as an add cause operation except that an insert cause operation adds the new cause at a user-specified location in the cause list, whereas an add cause operation adds the new cause to the end of the cause list.

If the desired operation is not an insert cause operation, the logic moves to decision block 326 where a test is made to determine if the desired operation is a delete cause operation. If so, the logic moves to block 328 where a delete cause operation is performed. Preferably, the user verifies the deletion of the selected cause. Upon verification, the database is updated to delete the cause from the system. Preferably, tasks associated with the deleted cause are also deleted.

Figure 18:
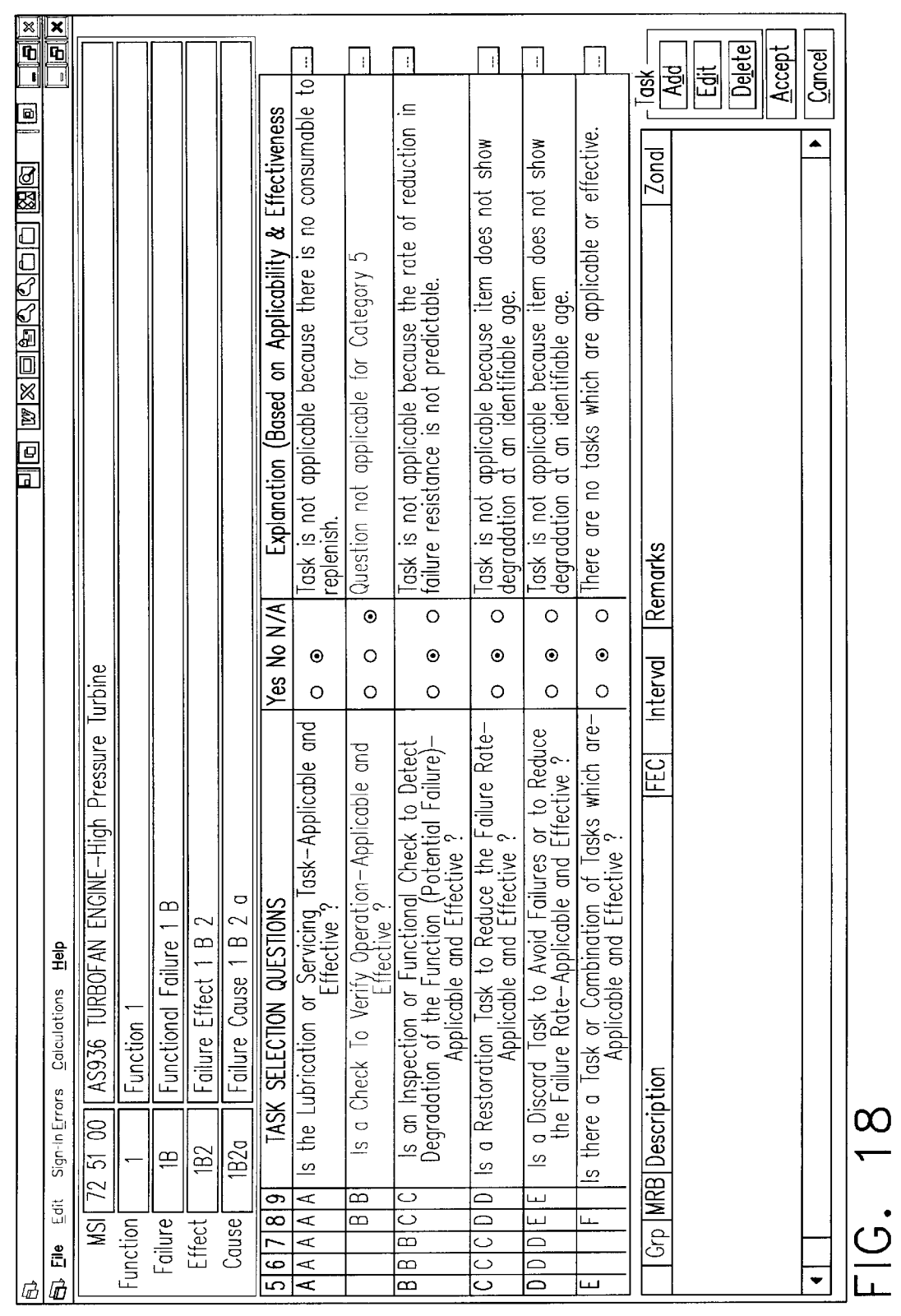

If the desired operation is not a delete cause operation, the logic moves to decision block 330 where a test is made to determine if the desired operation is a task selection operation. If so, the logic moves to block 342 where a task selection operation is performed. The task selection operation displays a user interface screen such as the one shown in FIG. 18. The user enters task information, such as which task types are applicable and effective and when (i.e., at what intervals) the tasks should be performed. After the desired cause operation has been performed (e.g., add, select, edit, insert, delete or task), the logic of FIG. 11 ends and processing returns to FIG. 4.

Returning to FIG. 4, if the operation to be performed is not a cause operation, the logic moves to decision block 156 where a test is made to determine if the operation to be performed is a print operation. If so, the logic moves to block 158 where a print operation is performed. In a preferred embodiment, printing is invoked via a print option on the file menu of menubar 502. Preferably, a user can select a system, a subsystem, a sub-subsystem or a part about which data is to be printed. FIGS. 19–25 described below illustrate exemplary output for a subsystem.

FIG. 19 illustrates an exemplary form which provides an overview of a selected subsystem. The form includes the ATA number, part number and description for the subsystem and each of its components (e.g., sub-subsystems and parts). The form also includes the MSI selection information (i.e., answers to the four MSI questions) for the system and each of the system's components. If the answer to any of the questions is "yes" for one of the components, the answer for that question should be "yes" for the system. Preferably, a warning will be provided if a system includes a "no" answer to which there is a "yes" answer for one or more of the system's components.

Figure 20:
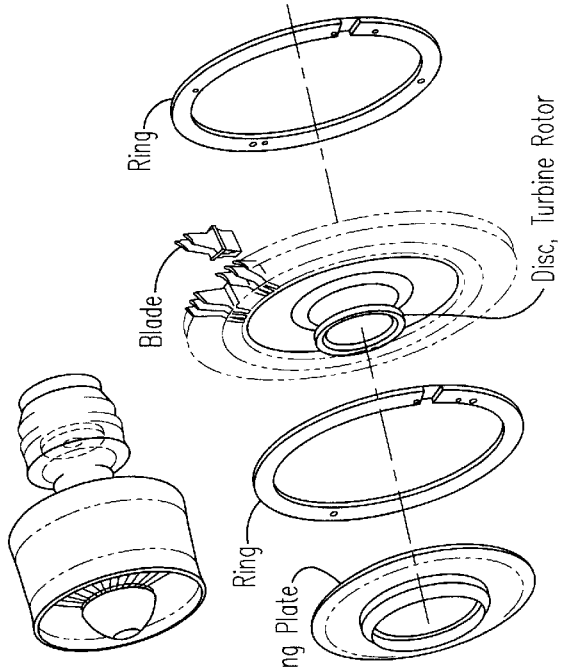

FIG. 20 is an exemplary form which shows the system breakdown, functional description and design features. This is the D&O information for the subsystem. As can be seen in FIG. 20, graphics can be included as D&O information.

FIG. 21 is an exemplary form which includes component and reliability data. The form includes an MSI number, a description, a quantity, a supplier and a part number for the subsystem and each of its components. The form also includes Similar To, Historical MTBUR, Predicted MTBUR and MMEL fields for the subsystem and each of its components.

FIG. 22 is an examplary Functional Failure Analysis form. This form lists the function for the subsystem. The functional failures, if any, for each function are listed. The effects and causes for each failure are listed.

FIG. 23 illustrates an exemplary form which categorizes failure effects. This form illustrates the failure categorization for one effect. There is a categorization for each effect. The form illustrates the categorization determined based on the user's answers to the Level 1 logic. (Evident safety; evident operational; evident economic; hidden safety; hidden economic).

FIG. 24 is an exemplary task selection questions form. This form displays the task data which was entered for a cause. As shown in FIG. 24, failures effects are categorized into one of five categories which are identified as categories 5–9 as follows: (5) evident safety; (6) evident operational; (7) evident economic; (9) hidden safety; and (9) hidden economic. Based on the category, a series of task types are considered. Tasks are selected based on task selection criteria as defined in the MSG-3. Regardless of the category, a determination is made as to whether a lubrication or servicing task is applicable and effective. If the category is a hidden category (safety or economic), a determination is made as to whether an operational check is applicable and effective. Regardless of the category, a determination is made as to whether a restoration task to reduce the failure rate is applicable and effective. For all categories, a determination is made as to whether a discard task to avoid failures or reduce the failure rate is applicable and effective. For safety categories (hidden and evident), a determination is made as to whether there is a combination of tasks that are applicable and effect. In the example shown in FIG. 24, the category is evident operational (6). The applicable questions were answered. Of the applicable questions, the only "yes" answer was to the question of whether an inspection or functional check is applicable and effective. A task list indicates that an inspection should be performed every 75 hours.

FIG. 25 is a maintenance task summary. It summarizes the tasks shown in FIG. 24. Preferably, there are various options for sorting task information (e.g., based on interval).

Returning to FIG. 4, after the appropriate operation is performed (e.g., system operation, subsystem operation, parts operation, function operation, failure operation, effect operation, cause operation or print operation), the logic of FIG. 4 ends and processing returns to FIG. 2. It will be appreciated that other functions not shown can be performed. For example, operations can be invoked via the menubar 502, for example, Exit and Help.

Returning to FIG. 2, after the user request has been processed, the logic returns to block 110 to wait for user input. In this manner, user requests are processed until it is time to exit. When it is time to exit, the logic of FIG. 2 ends.

While a specific embodiment of this invention has been described above, those skilled in the art will readily appreciate that many modifications are possible in the specific embodiment, without materially departing from the novel teachings and advantages of this invention. Accordingly, all such modifications are intended to be included within the scope of this invention, as defined in the following claims.

Having thus described the invention, what is claimed is:

1. A method for developing a maintenance program for a system, comprising:

a. initially defining a definition of said system, wherein said definition is hierarchical in nature and defined in terms of aircraft systems, aircraft subsystems and aircraft components, said aircraft systems, aircraft subsystems and aircraft components identified according to said aircraft systems', aircraft subsystems' and aircraft components' function, functional failure, failure effect and failure cause, where said definition is stored as data within at least one database;

b. identifying potential failures of said system according to said definition by allowing a user to select portions of data from said at least one database;

c. categorizing said failure effect through a predefined logic progression according to at least one category selected from a group consisting essentially of Evident Safety, Evident Operation, Evident Economic, Hidden Safety, and Hidden Non-Safety;

d. identifying maintainability and reliability data for said aircraft components, said data including predicted mean time between failure (MTBF), predicted mean time between unscheduled removals (MTBUR), historical MTBF and historical MTBUR;

e. identifying tasks which may eliminate or reduce the possibility of said potential failure occurring and detecting hidden failures that have occurred;

f. selecting said tasks based on applicability and effectiveness;

g. automatically updating said system in response to at least one user request, said at least one user request comprising at least one of a system operation, a subsystem operation, and a parts operation;

h. iteratively refining said tasks in response to said at least one user request and automatically updating said system; and i. providing a maintenance program comprised of said tasks to at least one users;

wherein said maintenance program is used to eliminate or reduce the occurrence of failures by determining said tasks for scheduled maintenance or intervals related to standards set by regulatory authorities, equipment operators, or manufacturers and wherein said updates are performed in real-time and said updates are immediately available for system or user purposes, thereby a group of users can meet to discuss a proposed change to said maintenance program to update said proposed change, run an analysis on said proposed change, review an output of said analysis, and finalize said proposed change to said maintenance program during a single meeting.

2. The method of claim 1, wherein said system is further comprised of at least one subsystem, sub-subsystem, or part.

3. The method of claim 2, wherein said system comprises at least one part, wherein said at least one part is associated with said system directly or indirectly via an association with one of said subsystems or one of said sub-systems.

4. The method of claim 1, wherein said database is initially created by importing information from an existing database.

5. The method of claim 1, wherein said database is initially defined by importing at least a portion of a plurality of existing databases.

6. The method of claim 1, wherein said system operation comprises at least one of:

a. a selection operation;
   b. an add operation;
   c. an edit operation;
   d. a delete operation;
   e. a description and operation operation; and
   f. a reliability data operation.

7. The method of claim 1, wherein said subsystem operation comprises at least one of:

a. a selection operation;
   b. an add subsystem operation;
   c. an add sub-subsystem operation;
   d. an edit operation;
   e. a delete operation;
   f. a description and operation operation; and
   g. a reliability data operation.

8. The method of claim 1, wherein said parts operation comprises at least one of:

a. a selection operation;
   b. an add operation;
   c. an edit operation;
   d. a delete operation.

9. The method of claim 1, wherein said system is further defined by at least one function.

10. The method of claim 9, wherein said function is further defined by at least one failure.

11. The method of claim 10, wherein said failure is further defined by at least one effect.

12. The method of claim 11, wherein said effect is further defined by at least one cause.

13. The method of claim 1, further comprising:

a. formatting said definition to provide a formatted definition;
   b. making said formatted definition available to a user.

14. A method for performing a hierarchical failure analysis, said method comprising.

a. creating at least one database containing information regarding systems, subsystems and components and said systems', subsystems' and components' function, functional failure, failure effect or failure cause related to an actual failure, said information derived from at least one source selected from a group consisting essentially of: initial data input; an existing database; and selected portions of multiple existing databases, wherein data in said at least one database may be re-used repeatedly without re-entry of said data, thereby new databases or derivative databases may be created from said at least one database and said new or derivative databases may be edited or updated;

b. displaying a user interface, wherein said user interface provides a hierarchical display for updating said database;

c. accepting at least one operation from a user which allows said user to copy selected portions of data residing within said at least one database;

d. processing at least one input request and automatically adding information regarding said at least one input to said database, said at least one input request comprising at least one of a system operation, a subsystem operation, and a parts operation;

e. categorizing, through a predefined logic progression, the failure effect from said at least one database according to at least one category selected from a group consisting essentially of Evident Safety, Evident Operation, Evident Economic, Hidden Safety, and Hidden Non-Safety;

f. defining at least one maintenance significant item for said system by defining reliability data and completing maintenance significant item selection for said at least one maintenance item, wherein said at least one maintenance significant item further comprises at least one characteristic selected from a group consisting essentially of (1) failure of said at least one maintenance significant item could affect safety on ground or in flight; (2) failure of said at least one maintenance significant item could be undetectable; (3) failure of said at least one maintenance significant item would not likely to be detected during an operation; (4) failure of said at least one maintenance significant item could have significant operational impact; and (5) failure of said at least one maintenance significant item could have significant economic impact;

g. creating a set of tasks utilizing information from said at least one database, each task in said set of tasks selected from a group consisting essentially of lubrication; servicing; operational checks; visual checks; inspections; functional checks; restoration; and discard operations;

h. accepting at least one operation from said user;

i. iteratively processing, said at least one input request and adding information regarding said at least one input to said at least one database; and j. iteratively refining said set of tasks.

15. A method for developing a maintenance program for a system, comprising:

a. initially defining a definition of said system, wherein said definition is hierarchical in nature and defined in terms of systems, subsystems and components, said systems, subsystems and components identified according to said systems', subsystems', and components' function, functional failure, failure effect and failure cause related to an actual failure, said system is further defined by at least one function, where said definition is stored as data in at least one database;

b identifying potential failures of said system according to said definition by allowing a user to select portions of data from said at least one database;

c. categorizing said failure effect as one of Evident Safety, Evident Operational, Evident Economic, Hidden Safety, and Hidden Non-Safety;

d. identifying maintainability and reliability data for said components, said data including predicted mean time between failure (MTBF), predicted mean time between unscheduled removals (MTBUR), historical MTBF and historical MTBUR;

e. identifying tasks which may eliminate or reduce the possibility of said potential failure occurring and detecting hidden failures that have occurred;

f. selecting said tasks based on applicability and effectiveness;

g. automatically updating said system in response to at least one user request, said at least one user request comprising at least one of a system operation, a subsystem operation, and a parts operation, wherein said system operation comprises at least one of a selection operation, an add operation, an edit operation, a delete operation, a description and an operation operation, and a reliability data operation, said subsystem operation comprises at least one of a selection operation, an add subsystem operation, an add sub-subsystem operation, an edit operation, a delete operation, a description and an operation operation, and a reliability data operation and said parts operation comprises at least one of a selection operation, an add operation, an edit operation and a delete operation and permitting said at least one user request and said automatic updates to be performed in parallel;

h. iteratively refining said tasks in response to said at least one user request and automatically updating said system; and i. providing a maintenance program comprised of said tasks to at least one user, wherein said maintenance program is used to eliminate or reduce the occurrence of failures by determining said tasks for scheduled maintenance or intervals related to standards set by regulatory authorities, equipment operators, or manufacturers and said method may be performed concurrently by multiple users;

wherein multiple users may concurrently access and change various data of the database and may then update said database with said changed data.

16. The method for developing a maintenance program for a system according to claim 15, wherein said function is further defined by at least one failure.

17. The method for developing a maintenance program for a system according to claim 16, wherein said failure is further defined by at least one effect.

18. The method for developing a maintenance program for a system according to claim 17, wherein said effect is further defined by at least one cause.

* * * * *